(12) United States Patent
Flick et al.

(10) Patent No.: US 11,194,464 B1
(45) Date of Patent: Dec. 7, 2021

(54) DISPLAY CONTROL USING OBJECTS

(71) Applicant: Amazon Technologies, Inc., Seattle, WA (US)

(72) Inventors: Kevin Charles Flick, Seattle, WA (US); Jiayi Liang, Seattle, WA (US); Martin Peter Aalund, Seattle, WA (US); James Merton Tidman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 51 days.

(21) Appl. No.: 15/827,253

(22) Filed: Nov. 30, 2017

(51) Int. Cl.
*G06F 3/0488* (2013.01)
*A63F 13/2145* (2014.01)
(Continued)

(52) U.S. Cl.
CPC ........ *G06F 3/0488* (2013.01); *A63F 13/2145* (2014.09); *G06F 3/04842* (2013.01);
(Continued)

(58) Field of Classification Search
CPC .................. G06F 3/039; G06F 3/0393; G06F 2203/04809; G06F 3/0425; G06F 3/044; G06F 3/04842; G06F 3/0488; G06F 3/16; G06F 2203/04105; G06F 3/041; G06F 3/0412; G06F 3/0414; G06F 3/04144; G06F 3/04142; G06F 3/04146; G06F 3/0416; G06F 3/04162; G06F 3/042; H04R 2499/15; H04R 2499/11; H04R 2499/10; H04R 2499/00; H04R 1/028; H04R 1/02; H04R 1/00; H04R 1/40; H04R 1/406; H04R 3/00; H04R 3/005; G10L 25/51; G10L 25/57; G10L 25/48; G10L 25/00; A63F 13/218; A63F 13/2145; A63F 13/42;
(Continued)

(56) References Cited

U.S. PATENT DOCUMENTS 5,694,045 A * 12/1997 Ikeda ........................ A63F 9/04
324/652
7,418,392 B1 8/2008 Mozer et al.
(Continued)

FOREIGN PATENT DOCUMENTS

WO WO2011088053 7/2011
WO WO-2016124584 A2 * 8/2016 ............. A63F 13/24

OTHER PUBLICATIONS

Gupta et al. "Soundwave: Using the Doppler Effect to Sense Gestures". CHI 2012, Session: Sensory Interaction Modalities, May 5-10, 2012, Austin, TX, pp. 1911-1914. (Year: 2012).*
(Continued)

*Primary Examiner* — Julie Anne Watko
(74) *Attorney, Agent, or Firm* — Lee & Hayes, P.C.

(57) ABSTRACT

Systems and methods for controlling display of content using objects are disclosed. Objects may be placed on a surface and one or more computing devices may be configured to identify the objects, determine the shape of the objects, and/or determine the locations of the objects with respect to the surface. Content displayed on the surface may be updated based at least in part on interaction of the object with the surface, such as changing locations of the objects, object proximities, object flipping, and/or object stacking, for example.

17 Claims, 11 Drawing Sheets

(51) Int. Cl.
*G06F 3/041* (2006.01)
*G06F 3/045* (2006.01)
*G06F 3/0484* (2013.01)
*G06F 3/044* (2006.01)
*G06F 3/042* (2006.01)
*A63F 13/42* (2014.01)
*G06F 3/16* (2006.01)
*H04R 3/00* (2006.01)
*G10L 25/51* (2013.01)
*H04R 1/02* (2006.01)
*H04R 1/40* (2006.01)

(52) U.S. Cl.
CPC .............. *A63F 13/42* (2014.09); *G06F 3/044* (2013.01); *G06F 3/0425* (2013.01); *G06F 3/16* (2013.01); *G06F 2203/04105* (2013.01); *G10L 25/51* (2013.01); *H04R 1/028* (2013.01); *H04R 1/406* (2013.01); *H04R 3/005* (2013.01); *H04R 2499/15* (2013.01)

(58) Field of Classification Search
CPC ........ A63F 13/214; A63F 13/21; A63F 13/20; A63F 13/00; A63F 13/424; A63F 13/426; A63F 13/40
See application file for complete search history.

(56) References Cited

U.S. PATENT DOCUMENTS

| | | | | |
|---|---|---|---|---|
| 7,474,983 | B2* | 1/2009 | Mazalek | G06F 3/011 702/150 |
| 7,720,683 | B1 | 5/2010 | Vermeulen et al. | |
| 7,774,204 | B2 | 8/2010 | Mozer et al. | |
| 7,911,453 | B2* | 3/2011 | Wilson | G06F 3/041 345/156 |
| 7,993,201 | B2* | 8/2011 | Matsumoto | A63F 13/42 345/173 |
| 9,489,059 | B2* | 11/2016 | Chung | G06F 3/03545 |
| 9,548,865 | B2* | 1/2017 | Hewitt | H04L 9/3234 |
| 9,880,643 | B1* | 1/2018 | Park | G06F 3/03543 |
| 2005/0280631 | A1* | 12/2005 | Wong | G02B 6/06 345/158 |
| 2007/0126864 | A1 | 6/2007 | Bhat et al. | |
| 2008/0004110 | A1* | 1/2008 | Cortenraad | A63F 3/00643 463/34 |
| 2008/0161086 | A1* | 7/2008 | Deere | A63F 3/02 463/14 |
| 2008/0186255 | A1 | 8/2008 | Cohen et al. | |
| 2009/0085828 | A1 | 4/2009 | Lee et al. | |
| 2009/0310088 | A1 | 12/2009 | Jung et al. | |
| 2010/0066016 | A1* | 3/2010 | Van De Wijdeven | G06F 3/0421 273/237 |
| 2011/0071757 | A1 | 3/2011 | Lee et al. | |
| 2011/0095992 | A1* | 4/2011 | Yeh | G06F 3/03543 345/173 |
| 2011/0108625 | A1* | 5/2011 | Lee | A63F 13/2145 235/448 |
| 2011/0190052 | A1 | 8/2011 | Takeda et al. | |
| 2011/0254832 | A1 | 10/2011 | Wilson et al. | |
| 2011/0316767 | A1* | 12/2011 | Avrahami | G06F 1/1626 345/156 |
| 2012/0007817 | A1* | 1/2012 | Heatherly | G06F 3/0416 345/173 |
| 2012/0019480 | A1* | 1/2012 | Cannon | A63F 13/02 345/174 |
| 2012/0026166 | A1 | 2/2012 | Takeda et al. | |
| 2012/0194457 | A1* | 8/2012 | Cannon | G06F 3/011 345/173 |
| 2012/0223885 | A1 | 9/2012 | Perez | |
| 2012/0256824 | A1 | 10/2012 | Mizunuma et al. | |
| 2013/0002522 | A1 | 1/2013 | Wilsher | |
| 2013/0127748 | A1 | 5/2013 | Vertegaal et al. | |
| 2013/0176202 | A1 | 7/2013 | Gervautz | |
| 2013/0342569 | A1 | 12/2013 | Karkkainen et al. | |
| 2014/0002337 | A1 | 1/2014 | Bandringa et al. | |
| 2014/0015743 | A1* | 1/2014 | Seo | G06F 1/1694 345/156 |
| 2014/0016099 | A1 | 1/2014 | Choi et al. | |
| 2014/0098264 | A1 | 4/2014 | Koike | |
| 2014/0210748 | A1* | 7/2014 | Narita | G06F 3/0354 345/173 |
| 2014/0379853 | A1* | 12/2014 | Shelton | G06F 9/4868 709/217 |
| 2015/0302662 | A1* | 10/2015 | Miller | G02B 27/0172 345/633 |
| 2015/0375134 | A1* | 12/2015 | Zhang | A63F 13/21 446/484 |
| 2016/0062482 | A1* | 3/2016 | Nietvelt | G06F 3/0488 345/173 |
| 2016/0109969 | A1* | 4/2016 | Keating | G06F 3/03547 345/173 |
| 2016/0313821 | A1* | 10/2016 | Bui | G06F 3/039 |
| 2017/0038867 | A1* | 2/2017 | Buckett | G06F 3/044 |

OTHER PUBLICATIONS

Ullmer and Ishii. "The metaDESK: Models and Prototypes for Tangible User Interfaces". Proc. UIST '97, Oct. 14-17, 1997, ACM, pp. 1-10. (Year: 1997).*

Harrison et al. "Squeeze Me, Hold Me, Tilt Me! An Exploration of Manipulative User Interfaces". CHI '98, Apr. 18-23, 1998, pp. 17-24. (Year: 1998).*

Dourish. Where the Action Is: The Foundations of Embodied Interaction, MIT Press, Cambridge, Mass (2001), pp. 44-50. (Year: 2001).*

Milton Bradley Company, "Battleship Rules", 1990. (Year: 1990).*

Office action for U.S. Appl. No. 13/707,492, dated Jan. 12, 2016, Satoh, "Auxiliary Surface for Receipt of Content Associated with Content Provided on a Primary Surface", 20 pages.

Office action for U.S. Appl. No. 13/707,492, dated Oct. 3, 2016, Satoh, "Auxiliary Surface for Receipt of Content Associated with Content Provided on a Primary Surface", 25 pages.

Office Action for U.S. Appl. No. 13/707,492, dated Dec. 3, 2014, Juli A. Satoh, "Auxiliary Surface for Receipt of Content Associated with Content Provided on a Primary Surface", 14 pages.

Office action for U.S. Appl. No. 13/707,492, dated Feb. 24, 2017, Satoh, "Auxiliary Surface for Receipt of Content Associated with Content Provided on a Primary Surface", 25 pages.

Final Office Action for U.S. Appl. No. 13/707,492, dated Jun. 29, 2015, Juli A. Satoh, "Auxiliary Surface for Receipt of Content Associated with Content Provided on a Primary Surface", 20 pages.

Office Action for U.S. Appl. No. 13/707,492, dated Jul. 27, 2017, Satoh, "Auxiliary Surface for Receipt of Content Associated with Content Provided on a Primary Surface", 28 pages.

Office Action for U.S. Appl. No. 13/707,492, dated Sep. 11, 2015, Satoh, "Auxiliary Surface for Receipt of Content Associated with Content Provided on a Primary Surface", 20 pages.

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

DISPLAY CONTROL USING OBJECTS

BACKGROUND

Visual content may be displayed on a variety of surfaces and by a variety of devices. A user may interact with the displayed content via user input devices such as a mouse, a keyboard, or a touchscreen. Described herein are improvements in technology and solutions to technical problems that can be used to, among other things, control the display of content in new ways that enable new types of interactions and user experiences.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
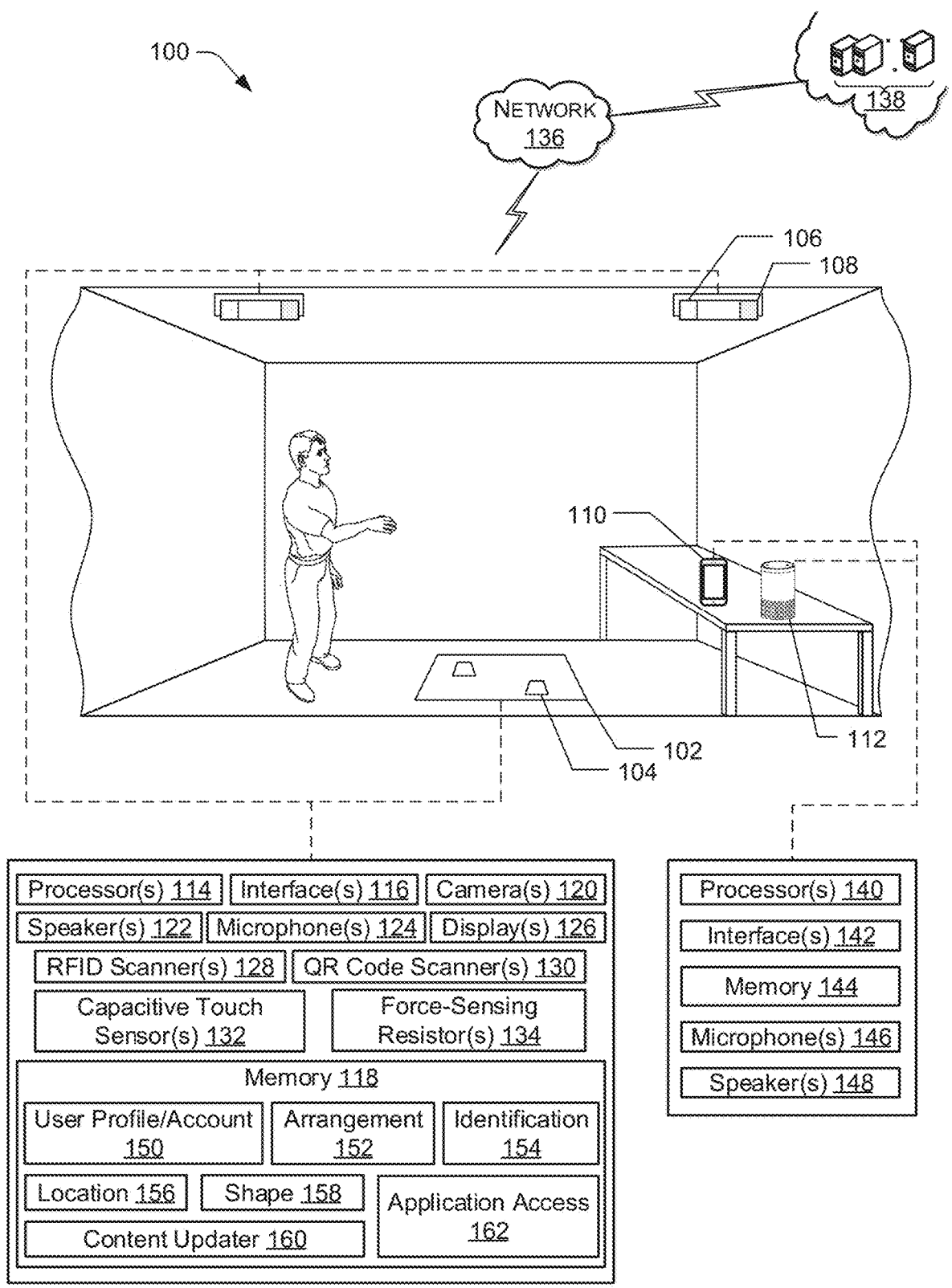
FIG. 1 illustrates a schematic diagram of an example environment for controlling display of content using objects.

Systems and methods for controlling display of content using objects are described herein. Take, for example, a surface capable of displaying visual content. The surface may reflect light projected onto it from, for example, a projector. Additionally, or alternatively, the surface may include a screen that displays content, such as a mobile phone, a tablet, a touchscreen device, and/or another computing device. Content may be displayed on the surface and a user may interact with the content and/or the surface to cause additional or different content to be displayed. The user may interact with the surface via user input devices such as a mouse, a keyboard, and/or a touchscreen configured to detect touches by a human finger or a stylus. However, these input devices typically only allow for selection of content by clicking on a rendering of a button, moving a cursor, highlighting text, and/or other single-point actions typically performed on a computing device.

Described herein are system and methods for using objects as input devices for interacting with displayed content and/or a surface on which the content is displayed such that the objects appear to be more sophisticated devices. The objects may be frames that include a metal and/or plastic border, for example. The objects may additionally, or alternatively, include tiles that include a material that allows content to be displayed thereon. In examples, the objects may include both a frame and a tile. In examples, the objects may be hard, not moldable objects. In other examples, the objects may be moldable to various shapes and sizes. The objects may not contain any computing components, such as processors, network interfaces, and/or memory. In these examples, the objects may include one or more physical fiducials. The fiducials may have an arrangement that is unique to the object and/or unique to the type of object. In other examples, the objects may contain one or more of various computing components, such as processors, network interfaces, memory, sound emitters, sensors, microphones, radio-frequency identification (RFID) components, and/or quick response (QR) code components, for example. In these examples, the objects may not include fiducials, or the objects may include one or more electronic fiducials and/or physical fiducials. In examples, third-party developers may generate applications that allow for interaction with objects and/or may develop objects. Information associated with the objects may be provided by the developers and utilized to identify objects placed on surfaces.

The objects, when placed on a surface having displayed content, may be utilized to interact with the displayed content and/or to control display of the content and/or other content. For example, the surface may include a multi-touch surface such as a touchscreen. When an object is placed on the touchscreen, the one or more physical fiducials may contact the touchscreen. Touch inputs corresponding to contact by the fiducials may be received via the touchscreen and a location of each touch input with respect to the touchscreen may be determined. The number of fiducials and/or the arrangement of the fiducials with respect to each other may serve as a fingerprint for the object and may be utilized to identify the object, determine the shape of the object, and/or determine the location of the object with respect to the touchscreen.

In addition to, or instead of, utilizing fiducials, one or more other means of determining the identity, the shape, and/or the location of the object may be utilized. For example, RFID scanners associated with the surface may be utilized to scan RFID tags of the objects. The RFID tags may provide a unique identifier of the object and/or the object type to the RFID scanner and information associated with the shape of the object. Additionally, distances between RFID scanners and the RFID tag may be determined and utilized to determine the location of the object with respect to the surface. Additionally, or alternatively, QR scanners and tags may be utilized in a similar manner to RFID scanners and tags to determine the identity, shape, and/or location of the objects. Additionally, or alternatively, sound emitters of the objects may produce a sound that may be captured by one or more microphones associated with the surface. The microphones may generate corresponding audio data and analyze that audio data to determine the identity, shape, and/or location of the objects. Additionally, or alternatively, one or more cameras associated with the surface may capture images of the surface and generate corresponding image data. The objects may be identified by analyzing the image data. The image data may also be utilized to determine the shape of the objects and/or their location.

Additionally, or alternatively, the content may be displayed on a surface using a projector, which may be disposed above the surface on which the content is to be displayed. In these examples, physical fiducials may be disposed on a side of the object opposite the side that is in contact with the surface. One or more cameras may capture images of the surface along with the object placed thereon and may generate corresponding image data. That image data may be analyzed to identify the object, determine the shape of the object, and/or determine the location of the object. By way of example, the projector may project a light array onto the surface. The surface may reflect light corresponding to that light array, which may be captured by the one or more cameras. Distortion of the light array by the object and/or fiducials of the object may be determined by analyzing the image data generated by the one or more cameras. This distortion may be used to identify the object, the shape of the object, and/or the location of the object. Additionally, or alternatively, electronic fiducials, RFID components, QR components, and/or sound emitters of the objects may be utilized to identify the object along with its shape and location. Depending on the content being displayed, the identity of the object, the shape of the object, and/or the location of the object with respect to the touchscreen, the displayed content may be updated.

By way of example, the content displayed on the touchscreen may include a game. The game may present numbers on the screen along with a visual and/or audible instruction to select a given number, such as the number "5." The user may place the object on the screen and may slide or otherwise place the object such that the number "5" is framed by the border of the object. The object may be designed so that the displayed content may appear on a top portion of the object, such that the content appears to be displayed on the object instead of on the surface like other content not framed by the border of the object. If the user successfully navigates the object to the "5," as determined from the location of the object for example, the displayed content may be updated to reflect that the user has chosen the correct number. For example, a visual indication that the user has chosen the correct number may be displayed, such as "Congratulations!" The visual indication may be displayed within the border of the object and/or on other portions of the screen. Additionally, or alternatively, audio may be output by one or more speakers associated with the screen based at least in part on the object's location. For example, the audio may provide an audible indication that the user has successfully navigated the object to the "5."

Additionally, or alternatively, image data corresponding to the displayed content may be sent to a remote system for display. Continuing with the example provided above, a child may be located at a home and may be interacting with a first screen and first objects to select a number from various numbers displayed on the first screen. Image data corresponding to the displayed content may be sent to a remote system including a second screen, such as a system being operated by a parent located at a remote location. Additionally, data may be sent to the remote system that indicates the location of the object being utilized by the child. A visual indication of where the child's object is located with respect to the child's playing surface may be displayed on the parent's screen. Additionally, in examples, a communication channel may be established between a device located proximate to the child and a device located proximate to the parent. The communication channel may allow the parent and child to interact to help the child navigate the object to the directed number.

As the child interacts with the object by navigating it around the child's playing surface, the visual indication of the child's object may be updated on the parent's screen. This may allow the parent to see if the child is making progress on selecting the correct number. In examples, the parent may also have an object and may place that object on a surface proximate to the parent. The location of the parent's object may be determined and data corresponding to the location of the parent's object may be sent to the system utilized by the child. A visual indication of the parent's object may be displayed on the child's playing surface to provide the child with an indication of how the parent is interacting with the parent's object. In this way, the parent may guide the child by, for example, moving the parent's object to the correct number. The child, seeing the parent's object move, may attempt to mimic the parent's action by moving the child's object to the same location as the visual indication of the parent's object. In this way, the objects may be utilized across systems to control display of content on multiple surfaces. It should be understood that while one example of using objects to control display of content is provided above, this example is illustrative only and should not be construed as a limitation. Any number of example uses for objects that control the display of content are included in this disclosure.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for controlling display of content using objects. The system 100 may include, for example, a surface 102 configured to receive one or more objects 104. The system 100 may additionally, or alternatively, including one or more projectors 106 and/or one or more cameras 108. The system 100 may additionally include one or more devices that may assist in accessing applications and/or content to be displayed on the surface 102. Those devices may include, for example, a personal device such as a mobile device 110 and/or a communal device 112 such as a voice-assistant device.

The surface 102 may not include any hardware and/or computing components but instead may be just a surface of an environment, such as a floor, a desktop, and/or a countertop, for example. In other examples, the surface 102 may be a component of a computing device, such as a touchscreen, which may have a multi-touch surface. In these examples, the computing device may include one or more processors 114, one or more network interfaces 116, memory 118, one or more cameras 120, one or more speakers 122, one or more microphones 124, one or more displays 126, one or more radio-frequency identification (RFID) components 128, one or more quick response (QR)

code components 130, one or more capacitive touch sensors 132, and/or one or more force-sensing resistors 134, for example. One or more of these components may be utilized to communicate with the projectors 106, cameras 108, mobile devices 110, and/or communal devices 112. Additionally, or alternatively, the computing device having the surface 102 may be configured to send and receive data, over a network 136, to a remote system 138.

Additionally, or alternatively, the projectors 106 and/or the cameras 108 may be components of a device that includes one or more of the components of the computing device having the surface 102. For example, the device that includes the projectors 106 and/or the cameras 108 may include processors 114, network interfaces 116, memory 118, cameras 120, speakers 122, microphones 124, RFID scanners 128, and/or QR Code scanners 130.

The mobile device 110 and/or the communal device 112 may include components such as one or more processors 140, one or more network interfaces 142, memory 144, one or more microphones 146, and/or one or more speakers 148. The mobile device 110 and/or the communal device 112 may be configured to send data to and receive data from the surface 102, the projectors 106, the cameras 108, and/or the remote system 138. The microphones 146 of the mobile device 110 and/or the communal device 112 may be configured to capture audio from the environment and generate corresponding audio data, which may be processed and/or sent to the various devices and system described with respect to FIG. 1. The speakers 148 of the mobile device 100 and/or the communal device 112 may be configured to receive audio data from one or more of the devices and/or systems described with respect to FIG. 1 and output corresponding audio into the environment.

As used herein, a processor, such as processor(s) 114 and/or 140, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 114 and/or 140 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 114 and/or 140 may possess its own local memory, which also may store program components, program data, and/or one or more operating systems.

The memory 118 and/or 144 may include volatile and nonvolatile memory, removable and non-removable media implemented in any method or technology for storage of information, such as computer-readable instructions, data structures, program component, or other data. Such memory 118 and/or 144 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 118 and/or 144 may be implemented as computer-readable storage media ("CRSM"), which may be any available physical media accessible by the processor(s) 114 and/or 140 to execute instructions stored on the memory 118 and/or 144. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 118 and/or 144, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 116 and/or 142 may enable communications between the components and/or devices shown in system 100 and/or with one or more other remote systems, as well as other networked devices. Such network interface(s) 116 and/or 142 may include one or more network interface controllers (NICs) or other types of transceiver devices to send and receive communications over the network 136.

For instance, each of the network interface(s) 116 and/or 142 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 116 and/or 142 may include a wide area network (WAN) component to enable communication over a wide area network.

In some instances, the remote system 138 may be local to an environment associated the surface 102, the projectors 106, the cameras 108, the mobile device 110 and/or the communal device 112. For instance, the remote system 138 may be located within the surface 102, the projectors 106, the cameras 108, the mobile device 110 and/or the communal device 112. In some examples, some or all of the functionality of the remote system 138 may be performed by one or more of the surface 102, the projectors 106, the cameras 108, the mobile device 110 and/or the communal device 112.

The memory 118 of the device having the surface 102, and/or the device having the projector 106, and/or the remote system 138 may include computer-executable instructions, described below as components of the memory 118, that when executed by the one or more processors 114 may cause the one or more processors 114 to perform various operations. Exemplary components of the memory 118 may include a user profile/account component 150, an object arrangement component 152, an identification component 154, a location component 156, a shape component 158, a content-updater component 160, and/or an application-access component 162. It should be noted that while the components described herein are illustrated as components of the memory 118 of the device having the surface 102 and/or the projector 106, this is provided by way of illustration. Some or all of the components and/or functionalities of the memory 118 may be stored on and/or accessed by memory of the remote system 138 and/or the memory 144 of the mobile device 110 and/or the communal device 112. The operations performed by the processors 114 executing instructions stored on the memory 118 may additionally, or alternatively, be performed by processors of the remote system 138 and/or the processors 140 of the mobile device 110 and/or the communal device 112. Each of these exemplary components of the memory are described below.

The user profile/account component 150 may be configured to identify, determine, and/or store data indicating relationships between users, user profiles, user accounts, devices, and/or objects 104. By way of example, for a given environment, such as a home, user profiles and/or user accounts may be associated with the mobile device 110 and/or the communal device 112 and/or the device having the surface 102 and/or the device having the projectors 106. These associations may be identified, determined, and/or stored by the user profile/account component 150. Additionally, or alternatively, associations between the devices of the environment may be identified, determined, and/or stored by the user profile/account component 150. By way of example, associations between the mobile device 110 and/or the communal device 112 and/or the device having the surface 102 and/or the device having the projectors 106 may be identified, determined, and/or stored. Additionally, or alternatively, one or more of the objects 104 may be associated with the device having the surface 102, the device having the projectors 106, the mobile device 110, and/or the communal device 112.

The arrangement component 152 may be configured to determine an arrangement of components of the objects 104. By way of example, in instances where the device having the surface 102 includes a touchscreen, when an object 104 is placed on the surface 102, touch inputs corresponding to contact by fiducials of the object 104 may be received by the surface 102. The arrangement component 152 may receive the touch inputs and may determine a number of contacts associated with the touch inputs. The number of contacts may correspond to the number of physical fiducials of the object 104.

Receiving touch inputs may be based on data received by one or more capacitive touch sensors 132 and/or one or more force-sensing resistors 134, for example. With respect to the capacitive touch sensors 132, contact by an object may cause a capacitance. Contact by a fiducial on the capacitive touch sensor 132 may cause a given capacitance, which may cause the generation of data indicating that a touch has occurred at or near the location of the capacitive touch sensor 103. With respect to the force-sensing resistors 134, contact by an object may cause a resistance. Contact by a fiducial on the force-sensing resistor 134 may cause a given resistance, which may cause the generation of data indicating that a touch has occurred at or near the location of the force-sensing resistor 134. The force-sensing resistor 134 may sense changes in a resistive value associated therewith depending on how much the resistor 134 is pressed, these changes in resistive value may be correlated to the amount of force applied. By way of example, the object 104 may have three fiducials. When the object 104 is placed on the surface 102, the three fiducials make contact with the surface 104 and cause three touch inputs, which are received by the arrangement component 152 and utilized to determine that the object 104 includes three fiducials, at least on the side of the object 104 that is proximate to the surface 102.

The arrangement component 152 may be further configured to determine a distance between fiducials and/or an orientation of fiducials with respect to each other. For example, continuing with the example of an object 104 with three fiducials, the three fiducials may be disposed at three locations with respect to the object 104. The arrangement component 152 may be configured to determine a distance between the first fiducial and the second fiducial, between the first fiducial and the third fiducial, and/or between the second fiducial and the third fiducial. The distances may be determined based at least in part on the touch inputs corresponding to contact on the surface 102 by the fiducials. By way of example, on a given surface 102, an x,y-coordinate system may be applied to the surface 102 for mapping purposes. A first touch input corresponding to contact by the first fiducial may have a first x,y coordinate, a second touch input corresponding to contact by the second fiducial may have a second x,y coordinate, and a third touch input corresponding to contact by the third fiducial may have a third x,y coordinate. The x,y coordinates of the touch inputs may be compared to determine a distance between touch inputs. It should be appreciated that while distance determination is described herein as being performed using an x,y-coordinate system, other means of determining distance may be utilized.

With respect to determining the orientation of fiducials with respect to each other as performed by the arrangement component 152, directional data may be determined for a line formed by connection of two points corresponding to two touch inputs by the fiducials. Directional data may be determined for a line associated the first fiducial and the second fiducial, for a line associated with the first fiducial and the third fiducial, and/or for a line associated with the second fiducial and the third fiducial. The directional data may be utilized by the arrangement component 152 to determine how the fiducials are oriented with respect to each other.

Additionally, or alternatively, in examples where the projector 106 is configured to project light onto the surface 102, the objects 104 may include physical fiducials located on a side of the object 104 opposite the side in contact with the surface 102. Light from the projector may hit the surface 102 and the fiducials. The fiducials may be configured to reflect light in a manner that differs from how light is reflected by the surface 102 and/or other portions of the object 104. The light reflected by the fiducials may be captured by one or more cameras 108, which may generate corresponding image data. The image data may be analyzed and the portions of the image data corresponding to the light reflected off the fiducials may be identified. Using this information, the number of fiducials may be identified, distances between the fiducials may be determined, and/or directional data associated with the fiducials may be determined.

Additionally, or alternatively, the projector 106 may project a light array onto the surface. A portion of the light array may hit the fiducials, which may cause distortion of the light array in a manner that differs from distortion, if any, caused by the surface 102 and/or other components of the object 104. The cameras 108 may capture the distorted light reflected off the fiducials and generate corresponding image data. The distorted light may be identified by analysis of the image data to identify the number of fiducials and their arrangement.

Additionally, or alternatively, the fiducials may include lighting elements that emit light. The lighting elements of the fiducials may be configured to output light at a given wavelength and/or modulation that differs from light reflected off the surface 102 and/or other components of the object 104. The cameras 108 may capture the light output by the light elements of the fiducials and generate corresponding image data. The image data may be analyzed and the number of fiducials and their arrangement with respect to each other may be determined.

Additionally, or alternatively, the objects 104 may be configured to send data to the device having the surface 102 and/or the projector 106 that indicates an arrangement of the fiducials. For example, the objects 104 may send data via the network interfaces 116 described above via, for example, Bluetooth protocol. The data may be received by the device having the surface 102 and/or the projector 106, the mobile device 110, and/or the communal device 112. The data may indicate the number of fiducials associated with the object 104 and/or the orientation of the fiducials with respect to each other.

The identification component 154 may be configured to determine an identity of a given object 104 and/or a type of object 104. For example, the identification component 154 may utilize the arrangement data generated by the arrangement component 152 to determine the identity of the object 104 and/or a type of object 104. By way of example, a given object 104 may include a unique arrangement of fiducials. Data representing the unique arrangement of the fiducials may be stored in a database along with an identifier corresponding to the object 104. When an object 104 is placed on the surface 102 and the arrangement of the fiducials of the object 104 is determined by the arrangement component 152, the arrangement may be compared to the stored arrangement data. When the detected arrangement of fiducials matches or substantially matches the stored arrangement data of a previously-used object 104 and/or an object 104 for which arrangement data is already known, the identification component 154 may determine that the object 104 that is currently placed on the surface may be identified as the previously-used or already-known object 104.

By way of example, objects 104 may come in various shapes and sizes, and even in examples where two objects 104 have the same shape and/or size, each of the two objects 104 may have different fiducial arrangements such that each object's fiducials are unique. When an object 104 is placed on the surface 102, the arrangement of the fiducials may be determined and corresponding arrangement data may be stored in a database along with an identifier of the object 104. Thereafter, when the object 104 is placed on the surface 102, the arrangement of the object 104 may be determined and compared to the stored arrangement data. Since, in this example, the stored arrangement data will match the detected arrangement, the identification component 154 may determine that the object 104 placed on the surface 102 is the previously-used object 104. Additionally, or alternatively, object identifications may be determined based at least in part on an application being utilized and/or the content being displayed. For example, a card-playing application may be sold with or otherwise be associated with one or more objects 104. Accessing and/or using the application may result in arrangement data associated with the objects 104 being stored in the database or otherwise accessible by the identification component 154.

Additionally, or alternatively, the identification component 154 may utilize data other than arrangement data of fiducials to identify an object 104. For example, in examples where an object 104 includes a sound emitter, the object 104 may be configured to emit sound at a specific frequency and/or range of frequencies that may be unique to the object 104 and/or the type of object 104. Additionally, or alternatively, the object 104 may be configured to modulate emitted sound with a unique modulation to the object 104 and/or the type of object 104. The microphones 124 of the device having the surface 102 and/or the projector 106 may capture the sound and generate corresponding audio data. That audio data may be compared to reference audio data for reference sound associated with objects 104. The object 104 may be identified by matching or substantially matching the reference sound with the detected sound.

Additionally, or alternatively, in examples where the object 104 includes a light element, the object 104 may be configured to emit light at a specific wavelength and/or range of wavelengths that may be unique to the object 104 and/or the type of object 104. Additionally, or alternatively, the object 104 may be configured to modulate emitted light with a unique modulation to the object 104 and/or the type of object 104. The cameras 120 of the device having the surface 102 and/or the projector 106 may capture images including the emitted light and generate corresponding image data. The image data may be compared to reference image data associated with objects 104. The object 104 may be identified by matching or substantially matching the reference image data with the detected image data.

Additionally, or alternatively, the identification component 154 may utilize data from RFID components of the objects 104 and the device having the surface 102 and/or the projector 106 to identify an object 104. For example, RFID scanners 128 associated with the surface 102 may be utilized to scan RFID tags of the objects 104. The RFID tags may provide a unique identifier of the object 104 and/or the type of object 104 to the RFID scanner 128. Additionally, or alternatively, QR code scanners 130 and tags may be utilized in a similar manner to RFID scanners 128 and tags to determine the identity of an object 104.

Additionally, or alternatively, the identification component 154 may utilize force data to identify an object 104. For example, certain objects 104 may have a first weight while other objects 104 may have a second, differing weight. Force data from force-sensing resistors, for example, may determine a force at which an object 104 is contacting the surface 102 and may associate that force with a weight of the object 104. This information may be utilized, at least in part, to determine an identity of the object 104 and/or a type of the object 104.

The location component 156 may be configured to determine a location of the object 104 with respect to the surface 102. One or more methods may be utilized to determine the location of the object 104. For example, the touch input information described with respect to the arrangement component 152 may be utilized to determine x,y coordinates of touches that correspond to fiducials of the object 104. Based at least in part on these touch inputs, and, in examples, the identity of the object 104 as determined by the identification component 154, the location of the object 104 with respect to the surface 102 may be determined.

Additionally, or alternatively, the location component 156 may utilize the RFID information described above. For example, an object 104 may have an RFID tag associated with it. A first RFID scanner 128 associated with the surface 102 may scan the RFID tag of the object 104, which may indicate a first distance between the first RFID scanner 128 and the RFID tag. A second RFID scanner 128 associated with the surface 102 may scan the RFID tag of the object 104, which may indicate a second distance between the second RFID scanner 128 and the RFID tag. In examples where the two RFID scanners 128 are disposed in adjacent corners, the first distance and the second distance may be compared to determine the location of the RFID tag associated with the object 104. The location of the RFID tag, along with the identity of the object 104 as determined by, for example, the RFID tag, may be utilized to determine the location of the object. By way of further example, the RFID scanners 128 may be placed at differing locations with respect to surface 102, and in these examples RFID scanners 128 may be utilized to triangulate the position of the RFID tags of the objects 104. In these examples, three or more RFID scanners may be utilized. Additionally, or alternatively, the location component 156 may utilize the QR code information described above in a manner similar to the use of RFID information.

Additionally, or alternatively, the location component 156 may utilize time-difference-of-arrival data to determine the location of the object 104. For example, where the object 104 includes one or more sound emitters, the sound emitters may produce sound, which may be captured by two or more microphones 124 of the device having the surface 102 and/or the projector 106. A time at which each of the microphones 124 receives the sound may be determined and a time-difference-of-arrival calculation may be performed to determine the differences in time at which the sound arrived at the microphones 124. This information may be utilized to determine a distance from each of the microphones 124 to the sound emitter, which may be utilized to determine a location of the sound emitter and thus a location of the object 104.

Additionally, or alternatively, the location component 156 may utilize image data captured by one or more cameras 120 to determine the location of the object 104. For example, images representing the surface 102 and the object 104 placed thereon may be captured by the one or more cameras 120, which may generate corresponding image data. The image data may be analyzed to determine where portions of the image corresponding to the object 104 are located.

The shape component 158 may be configured to determine a shape of an object 104. For example, the touch input information described above with respect to the arrangement component 152 may be utilized to determine the shape of the object 104. By way of example, the object 104 may be configured with fiducials that are disposed on corners and/or edges of the object 104. The arrangement component 152 may determine the orientation of the fiducials and that information may be utilized to determine the outline and/or boundary of the object 104. This information may be utilized to determine the shape of the object 104. By way of example, an object 104 may have a square shape with one fiducial disposed in each of the four corners of the object 104 along with, in some examples, additional fiducials disposed on the border of the object 104. Once placed on the surface 102, the arrangement component 152 may determine the orientation of the fiducials. Here, the orientation of the fiducials is at equal distances from each other and each arrangement of three of the fiducials is at a 90-degree angle. Based at least in part on the arrangement information, the shape component 158 may determine that the shape of the object 104 is a square.

Additionally, or alternatively, in examples where the object 104 includes an RFID tag, RFID scanners 128 of the device having the surface 102 and/or the projector 106 may scan the RFID tag, which may provide an identifier of the object 104. The identifying information may additionally include an indication of the shape of the object 104. The shape component 158 may utilize this information to identify the shape of the object 104. Additionally, or alternatively, in examples where the object 104 includes a QR code, QR code scanners 130 of the device having the surface 102 and/or the projector 106 may scan the QR code, which may provide an identifier of the object 104. The identifying information may additionally include an indication of the shape of the object 104. The shape component 158 may utilize this information to identify the shape of the object 104.

Additionally, or alternatively, the shape component 158 may utilize image data captured by one or more cameras 120 to determine the shape of the object 104. For example, images representing the surface 102 and the object 104 placed thereon may be captured by the one or more cameras 120, which may generate corresponding image data. The image data may be analyzed to determine the boundary of the object 104, which may be utilized to determine the shape of the object 104.

The content updater component 160 may be configured to render content based at least in part on the location of the object 104 with respect to the surface 102 and/or the identity and/or shape of the object 104. For example, the content updater component 160 may cause first content to be displayed on the surface 102. Based at least in part on the object 104 being placed on the surface 102, the content updater component 160 may cause different content to be displayed. Additionally, or alternatively, based at least in part on the object 104 being placed at and/or moved to a given location with respect to the surface 102, the content updater component 160 may cause different content to be displayed. Additionally, or alternatively, based at least in part on data from the arrangement component 152 indicating that two or more objects 104 are within a threshold distance from each other, such as, for example, within a centimeter, the content updater component 160 may cause different content to be displayed. The threshold distance may alternatively be, for example, within a millimeter, within 5 millimeters, within 2 centimeters, and/or within 5 centimeters. It should be understood that the example threshold distances are provided by way of illustration only. The display of differing content based at least in part on interactions of the object 104 with the surface 102 may be in a region of the surface 102 where the object 104 is located and/or in other regions of the surface 102.

The application access component 162 may be configured to download and/or access content to be displayed on the surface 102. The content may be accessed from memory 118 of the device having the surface 102 and/or the projector 106, and/or the mobile device 110, and/or the communal device 112, and/or the remote system 138. Accessed applications may include application programming interfaces (APIs) that may be utilized by one or more of the various devices in the environment to interact with the objects 104, and/or the various devices in the environment may include APIs that may be utilized by the accessed applications to interact with the objects 104.

Figure 2:
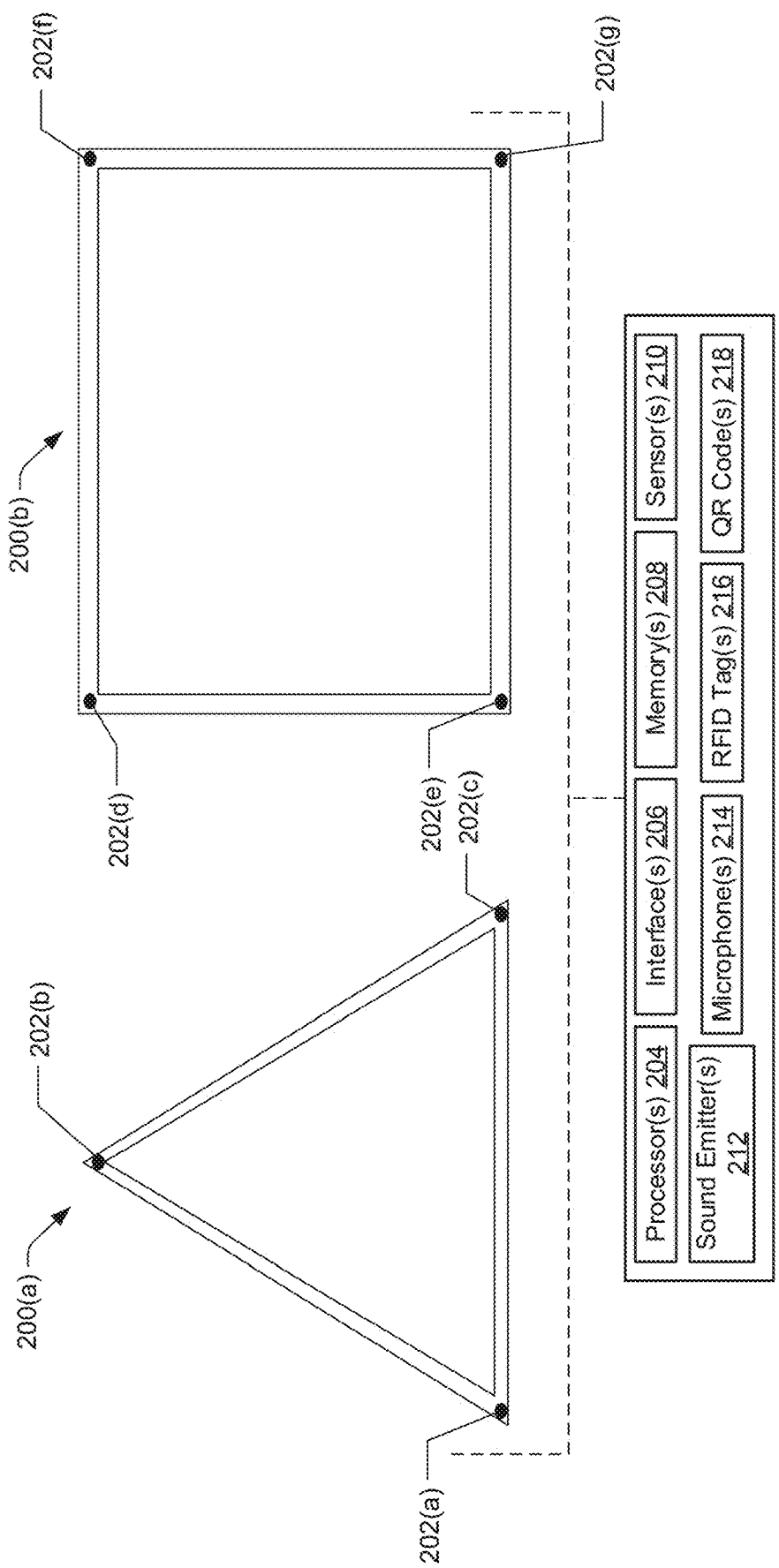
FIG. 2 illustrates example objects and example components thereof.

FIG. 2 illustrates example objects 200(a) and 200(b) and example components thereof. The objects 200(a)-(b) may include the same or similar components as the objects 104 described above with respect to FIG. 1. For example, with respect to the object 200(a), it may include one or more fiducials 202(a)-(c). The fiducials 202(a)-(c) may be disposed on one or more sides of the object 200(a) and may be disposed at various locations with respect to the object 200(a). As illustrated in FIG. 2, the fiducials 202(a)-(c) may be disposed on a border or boundary of the object 200(a) and may be disposed on the corners and/or edges of the object 200(a). In the example depicted with respect to the object 200(a), the object 200(a) has a triangular shape and each of the fiducials 202(a)-(c) are disposed at the three corners of the object 200(a). This arrangement of fiducials 202(a)-(c) may be determined by a touchscreen and/or a projector/camera system. As described more fully with respect to FIG. 1, above, the distances between the fiducials 202(a)-(c) and the directional data associated with the fiducials 202(a)-(c) may be determined and utilized to determine an identity of the object 200(a) and/or the object type and/or a shape of the object 200(a). In this example, the distances between the fiducials 202(a)-(c) may be the same or substantially similar and the directional data indicates that the object 200(a) has the shape of an equilateral triangle.

Although not depicted in FIG. 2, it should be noted that the fiducials of the object 200(a) need not be disposed on the corners as shown in FIG. 2. Additionally, or alternatively, fiducials may be disposed on any portion of the object 200(a). It should also be noted that while three fiducials 202(a)-(c) are shown in FIG. 2, one, two, three, or more than three fiducials may be disposed on the object 200(a). Additionally, or alternatively, while the fiducials 202(a)-(c) are shown as having uniform shape and size, it should be noted that the fiducials may have varying shapes and sizes with respect to a given object 200(a) and/or across multiple objects. Variances in the placement, shape, size, and/or number of fiducials on a given object may assist in identifying and/or determining an identity of the object 200(a) and/or an object type, a shape of the object 200(a), and/or a location of the object 200(a) with respect to a surface.

The object 200(b) depicted in FIG. 2 shows another object shape that differs from the object 200(a). As shown with respect to the object 200(b), the object 200(b) may have four fiducials 202(d)-(g). The fiducials 202(d)-(g) may be disposed at the corners of the object 200(b). Unlike the fiducials 202(a)-(c) from the object 200(a), the fiducials 202(d)-(g) of the object 200(b) have a different arrangement. For example, the distances between the fiducials 202(d) and 202(e) and the fiducials 202(f) and 202(g) are similar, but the distances between the fiducials 202(d) and 202(f) and 202(e) and 202(g), while similar to each other, differ from the other distances. The distances, along with the directional data associated with the fiducials 202(d)-(g), indicate that the object 200(b) has a rectangular shape.

In examples, the objects 200(a)-(b) may not include any computing components but instead may include only a frame portion, a tile portion, and/or both a frame portion and a tile portion. In other examples, the objects 200(a)-(b) may include one or more computing components, such as, for example, one or more processors 204, one or more network interfaces 206, memory 208, one or more sensors 210, one or more sound emitters 212, one or more microphones 214, one or more radio-frequency identification (RFID) tags 216, and/or one or more quick response (QR) codes 218. The processors 204 may be the same as or similar to the processors 114 and/or 140 described with respect to FIG. 1 and may be configured to perform the same or similar functionality. The network interfaces 206 may be the same as or similar to the network interfaces 116 and/or 142 described with respect to FIG. 1 and may be configured to perform the same or similar functionality. The memory 208 may be the same as or similar to the memory 118 and/or 144 described with respect to FIG. 1 and may be configured to perform the same or similar functionality.

Additionally, or alternatively, the memory 208 may be configured with instructions that, when executed by the processors 204, may cause the processors 204 to perform several operations. The operations may include, for example, sending data to one or more other objects, to a local device such as a mobile phone, a communal device, a television, or other electronic device capable of receiving data, and/or a remote system. The operations may additionally, or alternatively, include receiving data from one or more other objects, a local device, and/or a remote system. The operations may additionally, or alternatively, include causing the sensors 210 to activate and/or deactivate. The operations may additionally, or alternatively, include causing the sound emitters 212 to emit sound. The operations may additionally, or alternatively include causing the microphones 214 to capture audio and/or generate corresponding audio data. The memory 208 may additionally, or alternatively, be configured to store information associated with the object, such as, for example, data indicating an identity of the object, a shape of the object, one or more applications the object is associated with, one or more other objects associated with the object, and/or one or more devices the object is associated with. The operations may additionally, or alternatively, include sending data representing this information to one or more local and/or remote devices to assist in identification of the object, the shape of the object, and/or the location of the object.

The sensors 210 of the objects 200(a)-(b) may include, for example, components that help determine the location of the objects 200(a)-(b) with respect to each other and/or with respect to a surface on which the objects 200(a)-(b) have been placed. These sensors 210 may include proximity sensors, global positioning sensors, magnetic field sensors, infrared sensors, capacitance sensors, resistivity sensors, light sensors, tactile sensors, and/or vibration sensors, for example.

The sound emitters 212 may include, for example speakers, electromechanical buzzers, piezoelectric components, and/or mechanical buzzers. The sound emitters 212 may be configured to emit sound into an environment in which the objects 200(a)-(b) are disposed. The memory 208 may include instructions that, when executed by the processors 204, may cause the processors 204 to cause the sound emitters 212 to emit sound. In other examples, one or more other devices, such as a touchscreen device and/or a projector device and/or a mobile device and/or a communal device and/or a remote system may cause the sound emitters 212 to emit the sound. The sound emitted by the sound emitters 212 may be constant or modulated. When modulated, the sound may be emitted in a repetitive pattern and/or randomly. In examples, the modulated sound may be unique to the object emitting the sound and this information may be utilized to determine the identity of the object. The sound may be emitted at a constant frequency and/or acoustic energy. Alternatively, the sound may be emitted at modulated frequencies and/or acoustic energies. The frequencies at which the sound is emitted may be in the audible sound range or may otherwise be audible to a human and/or the frequencies may be in inaudible sound ranges or may otherwise not be audible to a human.

The sound emitters 212 may additionally, or alternatively, be configured to emit sound at specific times to assist in locating the objects 200(*a*)-(*b*). For example, a device associated with the surface on which the objects 200(*a*)-(*b*) have been placed may include microphones. The sound emitters 212 may be caused to emit sound such that the microphones capture the sound and generate corresponding audio data. A time difference of arrival may be determined with respect to the microphones of the device. The time-difference-of-arrival information may be utilized to determine a location of the sound emitters 212 of the objects 200(*a*)-(*b*), which may be utilized to determine a location of the objects 200(*a*)-(*b*).

Additionally, or alternatively, the sound emitters 212 may be configured to emit sound corresponding to speech. For example, a communication channel may be established between the objects 200(*a*)-(*b*) and a far-end talker. A device associated with the far-end talker may capture audio representing speech by the far-end-talker and may generate corresponding audio data. That audio data may be sent to the objects 200(*a*)-(*b*) and audio corresponding to the audio data may be output via the sound emitters 212.

The microphones 214 of the objects 200(*a*)-(*b*) may be configured to capture sound and generate corresponding audio data for processing and/or sending to other local and/or remote devices and systems. For example, when a communication channel has been established between the objects 200(*a*)-(*b*) and another device, the microphones 214 may capture audio representing human speech and may generate corresponding audio data to be sent to the other device for output via a speaker of the other device. Additionally, or alternatively, the microphones 214 may capture sound produced by the device associated with the surface on which the objects 200(*a*)-(*b*) have been placed and may generate corresponding audio data. That audio data may be processed to determine a location of the objects 200(*a*)-(*b*) with respect to the sound emitters of the surface device.

The objects 200(*a*)-(*b*) may additionally, or alternatively, include one or more RFID tags 216, which may also be described as RFID labels. In examples, the RFID tags 216 are passive and do not contain a battery. In these examples, the RFID tags 216 use radio energy transmitted by an RFID scanner, which may also be described as an RFID reader. In other examples, the RFID tags 216 may be active and/or battery-assisted passive. An active RFID tag 216 may include or be associated with a battery and may periodically transmit its identification signal. A battery-assisted passive RFID tag 216 may have a battery and may be activated when an RFID scanner is within a given proximity of the RFID tag 216. RFID may use electromagnetic fields to identify and track RFID tags 216 of the objects 200(*a*)-(*b*). The RFID tags 216 may contain or be associated with stored information, which may include an identifier of the RFID tags 216 and/or the objects 200(*a*)-(*b*) associated therewith, the shape of the objects 200(*a*)-(*b*), and/or other information associated with the arrangement of the objects 200(*a*)-(*b*), for example.

The objects 200(*a*)-(*b*) may additionally, or alternatively, include one or more QR codes 218, which may also be described as matrix barcodes. The QR codes 218 may include a machine-readable optical label that contains information about the objects 200(*a*)-(*b*) to which the QR codes 218 are associated. The QR codes 218 may function in the same or a similar manner to the passive RFID tags 216 described above. A given object 200(*a*) may include RFID tags 216, or QR codes 218, or both.

Figure 3:
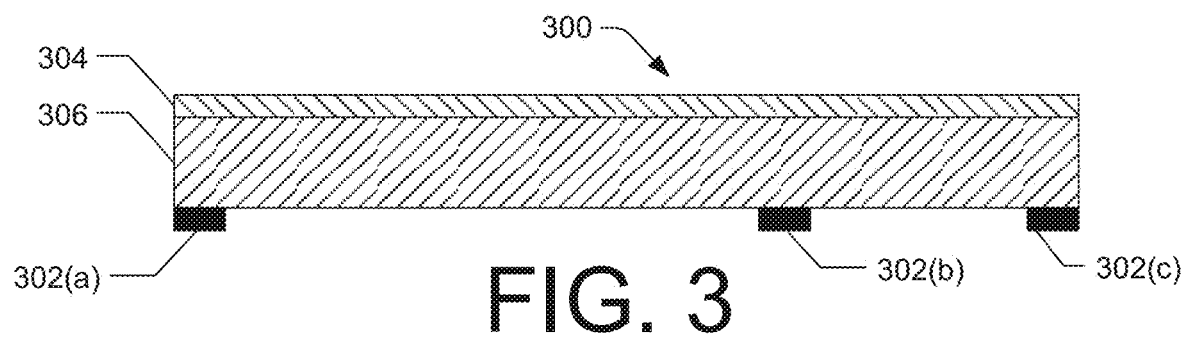
FIG. 3 illustrates an example object showing fiducials.

FIG. 3 illustrates an example object 300 showing fiducials. This figure shows the object 300 from a side, cross-sectional view. The object 300 may have the same or similar components as the objects 200(*a*)-(*b*) described with respect to FIG. 2. The object may include one or more fiducials 302(*a*)-(*c*). As shown in FIG. 3, the fiducials 302(*a*)-(*c*) may be disposed on a bottom side of the object 300. As used with respect to FIG. 3, the bottom side may be the side closest to the surface on which the object 300 is placed. The fiducials 302(*a*)-(*c*) may be spaced apart from each other and/or oriented in a manner that is unique to the object 300 and/or a type of object 300, such as an object 300 of a specific shape, size, or having a specific functionality. It should be understood that while three fiducials 302(*a*)-(*c*) have been depicted in FIG. 3, one, two, three, or more than three fiducials may be disposed on the bottom side of the object 300. Additionally, or alternatively, the fiducials 302(*a*)-(*c*) may have uniform shape and/or size or may have differing shapes and/or sizes with respect to the object 300 and/or other objects.

The object 300 may include a first portion 304 and a second portion 306. In examples, the object 300 may be configured for placement on a touchscreen. In these examples, the fiducials 302(*a*)-(*c*) may be disposed on the bottom side of the object 300 such that the fiducials 302(*a*)-(*c*) contact the display. In these examples, the second portion 306 of the object 300 may be composed of a material configured to allow light to pass from the display, through the second portion 306, and to the first portion 304. The material of the second portion 306 may be, for example, a transparent or substantially transparent glass, plastic, or other material.

The first portion 304 of the object 300 may be composed of a material that catches and/or reflects light received through the second portion 306 of the object 300. The material of the first portion 304 may have some degree of translucence and/or opaque qualities. For example, the first portion 304, or a portion thereof, may be constructed using abrasive blasting techniques that generate a rough surface. The first portion 304 may act as a screen such that light representing the image depicted on the display beneath the object 300 may travel through the second portion 306 to the first portion 304 may be viewable from the top side of the object 300. In these examples, the image may be projected from the display to the first portion 304 of the object 300 such that the image appears to be projected on the top side of the object 300. The thickness of the first portion 304 and/or the second portion 306 may vary. In the example shown in FIG. 3, the top portion 304 may have a first thickness that is less than a second thickness of the second portion 306 of the object 300. In other examples, the thickness of the first portion 304 and the second portion 306 may be the same or substantially similar, or the first portion 304 may have a thickness that is greater than the thickness of the second portion 306.

Figure 4:
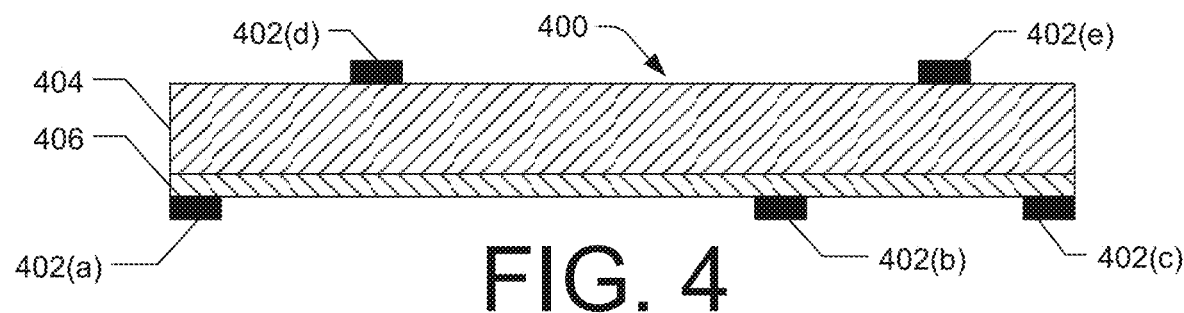
FIG. 4 illustrates another example object showing fiducials.

FIG. 4 illustrates an example object 400 showing fiducials. This figure shows the object 400 from a side, cross-sectional view. The object 400 may have the same or similar components as the objects 200(*a*)-(*b*) described with respect to FIG. 2. The object may include one or more fiducials 402(*a*)-(*e*). As shown in FIG. 3, a portion of the fiducials 402(*a*)-(*c*) may be disposed on a bottom side of the object 400. As used with respect to FIG. 4, the bottom side may be the side closest to the surface on which the object 400 is placed. Additionally, or alternatively, a portion of the fiducials 402(d)-(e) may be disposed on a top side of the object 400, which may be described as the side of the object 400 opposite the bottom side of the object 400.

The fiducials 402(a)-(e) may be spaced apart from each other and/or oriented in a manner that is unique to the object 400 and/or a type of object 400, such as an object 400 of a specific shape, size, or having a specific functionality. It should be understood that while five fiducials 402(a)-(e) have been depicted in FIG. 4, one, two, three, four, five, or more than five fiducials may be disposed on the object 400. Additionally, or alternatively, the fiducials 402(a)-(e) may have uniform shape and/or size or may have differing shapes and/or sizes with respect to the object 400 and/or other objects.

The object 400 may include a first portion 404 and a second portion 406. In examples, the object 400 may be configured for placement on a touchscreen. Additionally, or alternatively, a projector may be configured to project light onto a surface on which the object 400 has been placed. In these examples, the content to be displayed on the surface and/or the object 400 may be provided by the projector instead of from another type of display. In these examples, the fiducials 402(a)-(c) may be disposed on the bottom side of the object 400 such that the fiducials 402(a)-(c) contact the display. Additionally, or alternatively, the fiducials 402 (d)-(e) may be disposed on the top side of the object 400 such that light from the projector hits the fiducials 402(d)-(e). In these examples, one or more cameras may be configured to capture light that reflects off the surface and/or the object 400 and generate corresponding image data. The image data may be analyzed, as described more fully with respect to FIG. 1, to identify the object 400 and/or the fiducials 402(d)-(e). In examples where content is presented using a projector, the fiducials 402(a)-(c) may be absent from the object 400.

In these examples, the first portion 404 of the object 400 may be composed of a material configured to allow light to pass from the projector, through the first portion 404, and to the second portion 406. The material of the first portion 404 may be, for example, a transparent or substantially transparent glass, plastic, or other similar material. The second portion 406 of the object 400 may be composed of a material that catches and/or reflects light received through the first portion 404 of the object 400. The material of the second portion 406 may have some degree of translucence and/or opaque qualities. For example, the second portion 406, or a portion thereof, may be constructed using abrasive blasting techniques to generate a rough surface.

The second portion 406 may act as a screen such that light representing the image projected from the projector above the object 400 may travel through the first portion 404 to the second portion 406 and may be viewable from the top side of the object 400. In other examples where the projector projects light from above the object 400, the arrangement of the first portion 404 and/or the second portion 406 of the object 400 may be similar to the first portion 304 and/or the second portion 306 of the object 300 from FIG. 3. The thickness of the first portion 404 and/or the second portion 406 may vary. In the example shown in FIG. 4, the first portion 404 may have a first thickness that is greater than a second thickness of the second portion 406 of the object 400. In other examples, the thickness of the first portion 404 and the second portion 406 may be the same or substantially similar, or the first portion 404 may have a thickness that is less than the thickness of the second portion 406.

Figure 5:
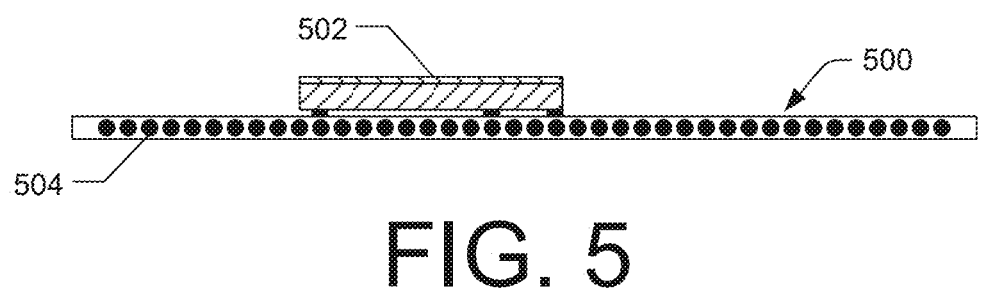
FIG. 5 illustrates an example touchscreen with an example object placed thereon.

FIG. 5 illustrates an example touchscreen 500 with an example object 502 placed thereon. This figure shows the touchscreen 500 and object 502 from a side, cross-sectional view. The object 502 may have the same or similar components as the objects 200(a)-(b) described with respect to FIG. 2. The touchscreen 500 may have the same or similar components as the surface 102 described above with respect to FIG. 1. Specifically, the touchscreen may include one or more capacitive touch sensors and/or one or more force-sensing resistors 504. With respect to the capacitive touch sensors, contact by an object may cause a capacitance. Contact by a fiducial on the capacitive touch sensor may cause a given capacitance, which may cause the generation of data indicating that a touch has occurred at or near the location of the capacitive touch sensor. With respect to the force-sensing resistors 504, contact by an object may cause a resistance. Contact by a fiducial on the force-sensing resistor 504 may cause a given resistance, which may cause the generation of data indicating that a touch has occurred at or near the location of the force-sensing resistor 504. The force-sensing resistor 504 may sense changes in a resistive value associated therewith depending on how much the resistor 504 is pressed. These changes in resistive value may be correlated to the amount of force applied.

Figure 6:
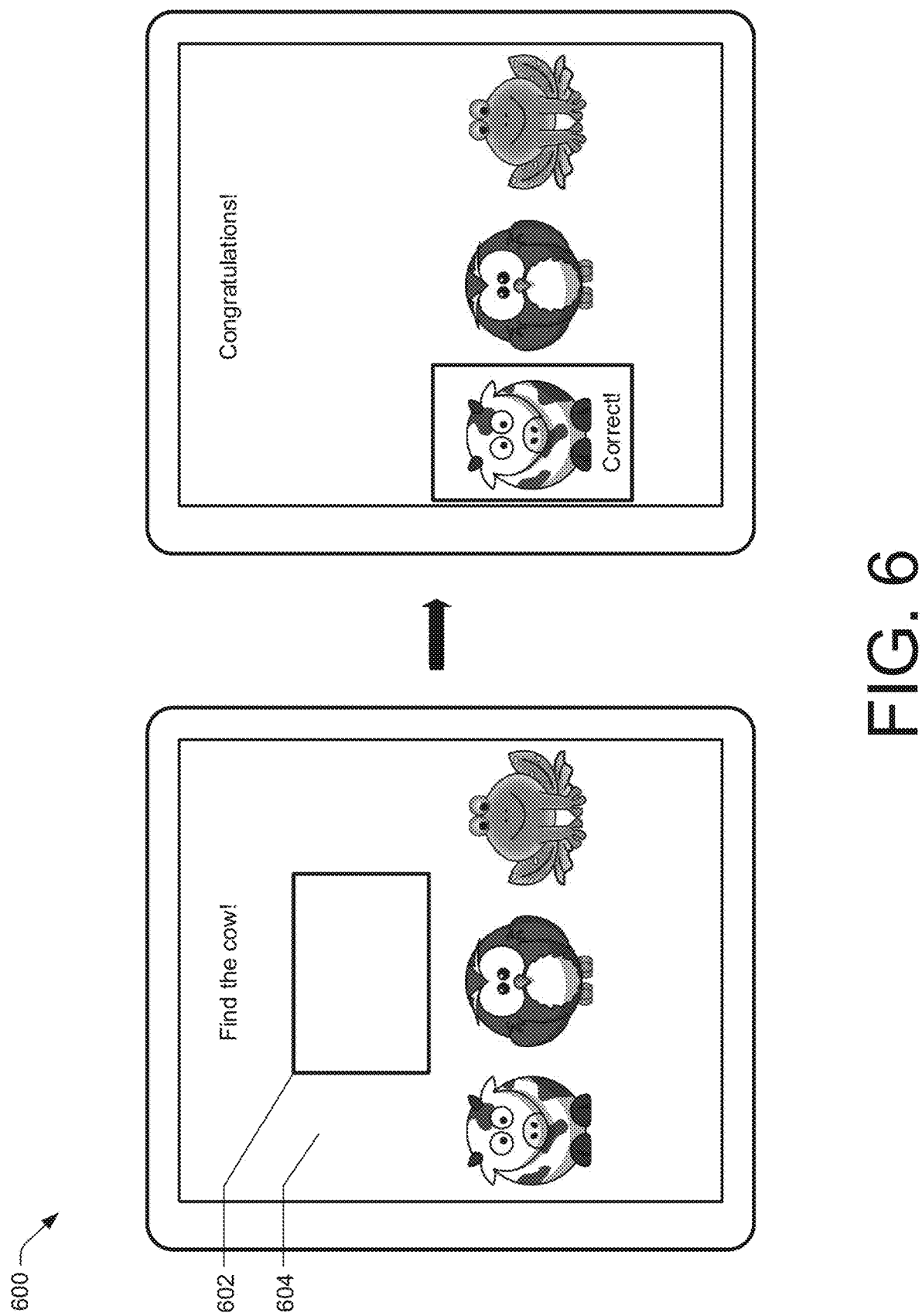
FIG. 6 illustrates an example user interface and interaction of an example object with the user interface.

FIG. 6 illustrates an example user interface 600 and interaction of an example object 602 with the user interface. FIG. 6 illustrates a progression, from left to right, of the user interface as a user interacts therewith. The user interface 600 may be displayed on a surface 604, which may be similar to the surface 102 described above with respect to FIG. 1. FIG. 6 illustrates an example use of an object 602 and interaction of the object 602 with the surface 604. As shown in FIG. 6, the content being presented on the surface 604 includes a game where a visual instruction to "Find the cow!" is presented to the user. Additionally, renderings of animal caricatures are also presented. Here, the caricatures are a cow, a bird, and a frog. In addition to, or instead of, the visual instruction, an audible instruction may be presented. The instruction may be presented based at least in part on the object 602 being placed on the surface 604, and/or when an arrangement of the object 602 has been identified and/or determined, and/or when a location of the object 602 has been identified and/or determined, and/or when a shape of the object 602 has been identified and/or determined.

The user may then move the object 602 around the surface 604, and as the location of the object 602 changes with respect to the surface 604, the changing location may be determined. When the user navigates the object 602 to a portion of the surface 604 associated with one of the caricatures, a local device and/or remote system may identify the location of the object 602 and may compare the object's location to locations of rendered content on the surface 604. In the example shown in FIG. 6, the user has moved the object 602 from a location near the middle of the surface 604 to a location near the bottom left-hand corner of the surface 604. This location may correspond to a location of one of the rendered caricatures, here the cow. The local device and/or remote system, having determined that the object 602 is located at the same or a similar location as one of the rendered caricatures, may cause second content to be displayed.

As shown in FIG. 6, the second content may include an indication of whether the caricature that the object 602 is now associated with has been correctly identified. Here, the user has successfully navigated the object 602 to the location of the surface 604 that is displaying a rendering of the cow caricature, and the local device and/or the remote system has caused second content including "Correct!" to be displayed. Had the user navigated the object 602 to a location of the surface 604 that did not include the cow, the local device and/or the remote system may have caused different second content to be displayed, such as "Try Again," for example. As shown in FIG. 6, the second content may include content that differs from the first content. The differing content may be displayed on a portion of the surface 604 that is within a boundary of the object 602, as shown in FIG. 6 with respect to the word "Correct!" Additionally, or alternatively, the differing content may be displayed on a portion of the surface 604 that is outside the boundary of the object 602, as shown in FIG. 6 with respect to the word "Congratulations!"

Additionally, or alternatively, the local device and/or the remote system may determine a size and/or a shape of the object 602. Data representing the size and/or shape of the object 602 may be utilized to adjust the size of the content being displayed on the surface 604. For example, as shown in FIG. 6, the size of the cow rendering on the surface 604 may be adjusted such that, when the object 602 is placed over the cow rendering, the cow rendering will fit inside the boundary of the object 602 along with, in examples, any differing content to be displayed, such as the word "Correct!" If a smaller object 602 is detected, the size of the renderings of the animal caricatures may be decreased. Likewise, a larger object 602 may result in the size of the renderings of the animal caricatures to be increased. The shape of the object 602 may additionally, or alternatively, influence the sizing of content displayed on the surface 604.

Figure 7:
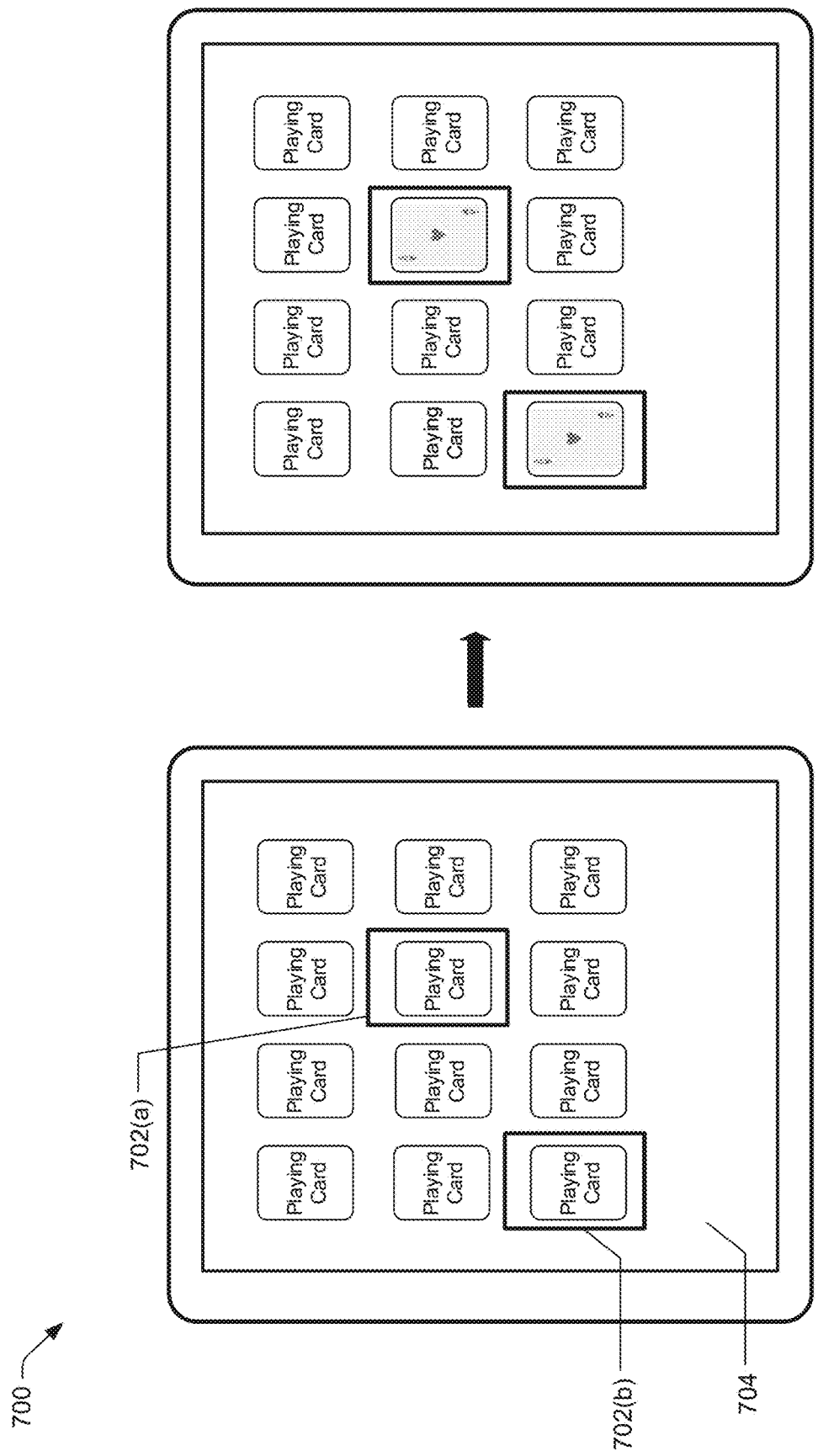
FIG. 7 illustrates another example user interface and interaction of example objects with the user interface.

FIG. 7 illustrates another example user interface 700 and interaction of example objects 702(a)-(b) with the user interface 700. FIG. 7 illustrates a progression, from left to right, of the user interface 700 as a user interacts therewith. The user interface 700 may be displayed on a surface 704, which may be similar to the surface 102 described above with respect to FIG. 1. FIG. 7 illustrates an example use of objects 702(a)-(b) and interaction of the objects 702(a)-(b) with the surface 704. As shown in FIG. 7, the content being presented on the surface 704 includes a rendering of a matching game, which the objects 702(a)-(b) may interact with.

By way of example, the user interface 700 may include a number of playing cards, such as the cards in a typical card deck and/or cards that include one or more images. A user of the user interface 700 may be directed to match the playing cards to complete the game. The playing cards may be presented based at least in part on at least one of the objects 702(a)-(b) being placed on the surface 704, and/or when an arrangement of at least one of the objects 702(a)-(b) has been identified and/or determined, and/or when a location of at least one of the objects 702(a)-(b) has been identified and/or determined, and/or when a shape of at least one of the objects 702(a)-(b) has been identified and/or determined.

A user may move one or more of the objects 702(a)-(b) toward portions of the surface 704 on which the playing cards have been displayed. In examples, when the location of an object 702(a) is the same as or is similar to the location of a rendering of a playing card on the surface 704, second content may be displayed. The second content may include a rendering of the downward-facing side of the playing card or may otherwise reveal the image on the other side of the card. In other examples, a user may flip the object 702(a) over such that the first side of the object 702(a) that was not in contact with the surface 704 is now in contact with the surface. One or more fiducials of the first side may differ from fiducials of the other side of the object 702(a). Touch inputs associated with the fiducials of the second side may be detected and utilized to determine that the object 702(a) has been flipped over. Additionally, or alternatively, RFID information may be utilized to determine if an object has been flipped. For example, signal strength may differ when an object is flipped, particularly in instances where the object includes a shield or other member between sides of the object. Different RFID signal strengths may be utilized to determine that an object has been flipped. Additionally, or alternatively, QR code information may be utilized to determine if an object has flipped. For example, different QR codes may be disposed on sides of an object, and the scanning of a particular QR code may indicate the orientation of the object. In other examples, a QR code may be scanned when a first side of the object is in contact with the surface and the reverse of that QR code may be scanned when a second side of the object is in contact with the surface. Data indicating that the object 702(a) has been flipped over may be utilized to cause display of the second content. In other words, flipping the object 702(a) may cause the rendering of the playing card to "flip over."

It should be appreciated that the example of a playing card game is provided herein by way of illustration only and not by way of limitation. Other content and functionalities, including with respect to detecting when an object is flipped from one side to another side, is included in this disclosure. Additionally, or alternatively, the local device and/or the remote system may determine a size and/or a shape of an object. Data representing the size and/or shape of the object may be utilized to adjust the size of the content being displayed on the surface 704.

Figure 8:
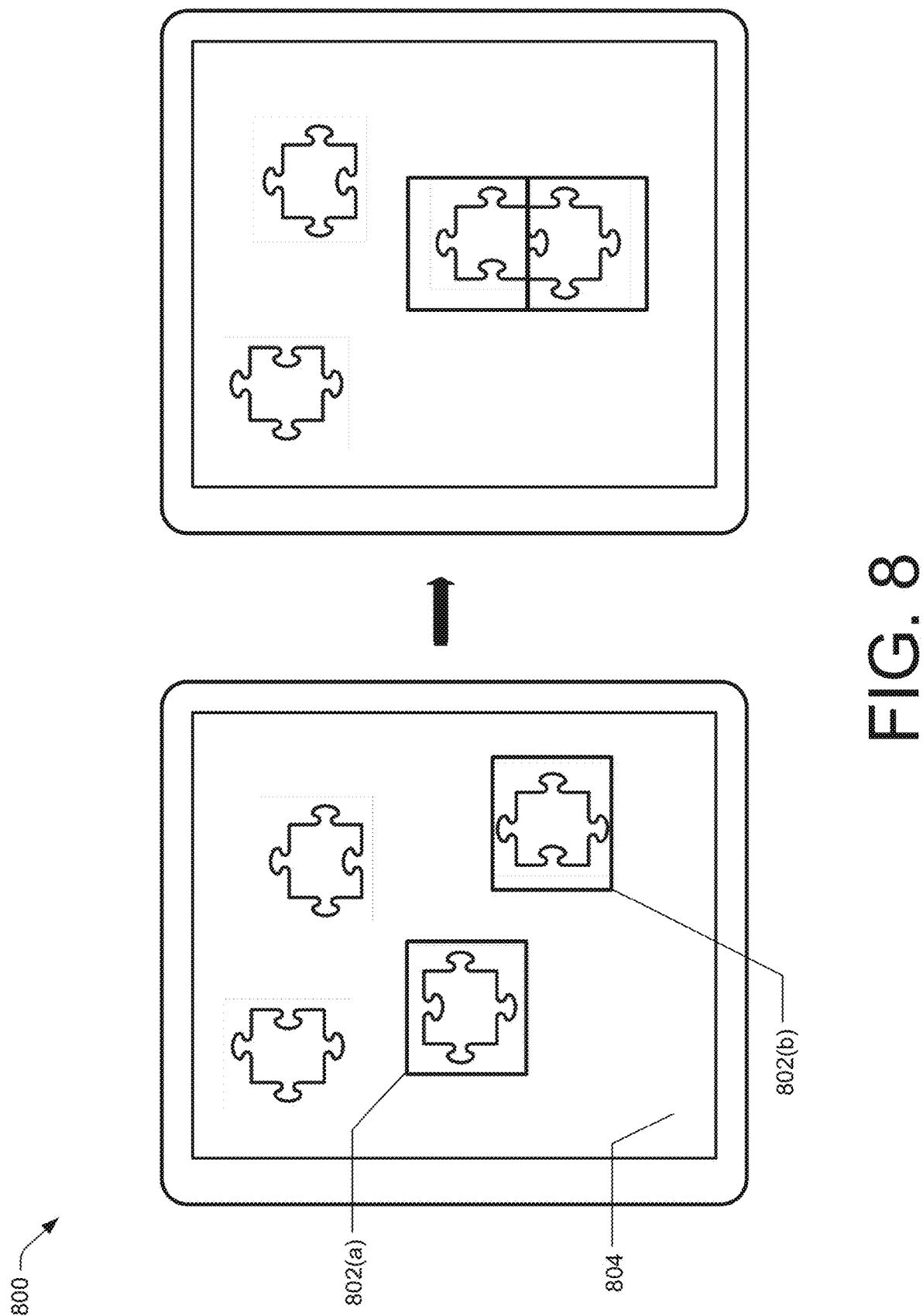
FIG. 8 illustrates another example user interface and interaction of example objects with the user interface.

FIG. 8 illustrates another example user interface 800 and interaction of example objects 802(a)-(b) with the user interface 800. FIG. 8 illustrates a progression, from left to right, of the user interface 800 as a user interacts therewith. The user interface 800 may be displayed on a surface 804, which may be similar to the surface 102 described above with respect to FIG. 1. FIG. 8 illustrates an example use of objects 802(a)-(b) and interaction of the objects 802(a)-(b) with the surface 804. As shown in FIG. 8, the content being presented on the surface 804 includes a rendering of a puzzle game, which the objects 802(a)-(b) may interact with.

By way of example, one or more renderings of puzzle pieces may be displayed on the surface 804. The objects 802(a)-(b) may be utilized to "grab" a puzzle piece and move that puzzle piece around the surface 804 and/or into proximity with other puzzle pieces. More specifically, an object 802(a) may be placed on the surface 804. The puzzle pieces may be presented based at least in part on at least one of the objects 802(a)-(b) being placed on the surface 804, and/or when an arrangement of at least one of the objects 802(a)-(b) has been identified and/or determined, and/or when a location of at least one of the objects 802(a)-(b) has been identified and/or determined, and/or when a shape of at least one of the objects 802(a)-(b) has been identified and/or determined. A user may move the object 802(a) to a portion of the surface 804 on which a puzzle piece is displayed. Based at least in part on the object's 802(a) location being the same or substantially similar to a location of the surface 804 on which a puzzle piece is displayed, the content displayed on the surface 804 may be updated. For example, the content may be dynamically updated when a user moves the object 802(a) such that the rendering of the puzzle piece appears to move along with the object 802(a). In this way, the object 802(a) may be used to "grab" and "drag" the puzzle piece around the surface 804.

A second object 802(b) may be introduced to the surface 804 and may "grab" another puzzle piece, as shown in FIG.

8. The user may then move one or more of the objects 802(a)-(b) into proximity with each other in a manner similar to how a user would move two physical puzzle pieces together. Based at least in part on the objects 802(a)-(b) being within a threshold distance of each other, the content displayed on the surface 804 may be updated. Using the puzzle game example provided herein, a user may move a first object 802(a) toward a second object 802(b) such that the first object 802(a) is touching or is nearly touching the second object 802(b).

Based at least in part on the proximity of the two objects 802(a)-(b) being within a threshold distance from each other, a local device and/or a remote system associated with the surface 804 may update the content displayed on the surface 804. Here, for example, the content displayed on the surface 804 may be updated such that the two puzzle piece renderings may appear to be connected to each other. Additionally, or alternatively, a determination that two or more objects 802(a)-(b) are within a threshold distance from each other may enable and/or disable functionality of the surface 804, the objects 802(a)-(b), the local device, the remote system, and/or an application being utilized in connection with the objects 802(a)-(b).

Figure 9:
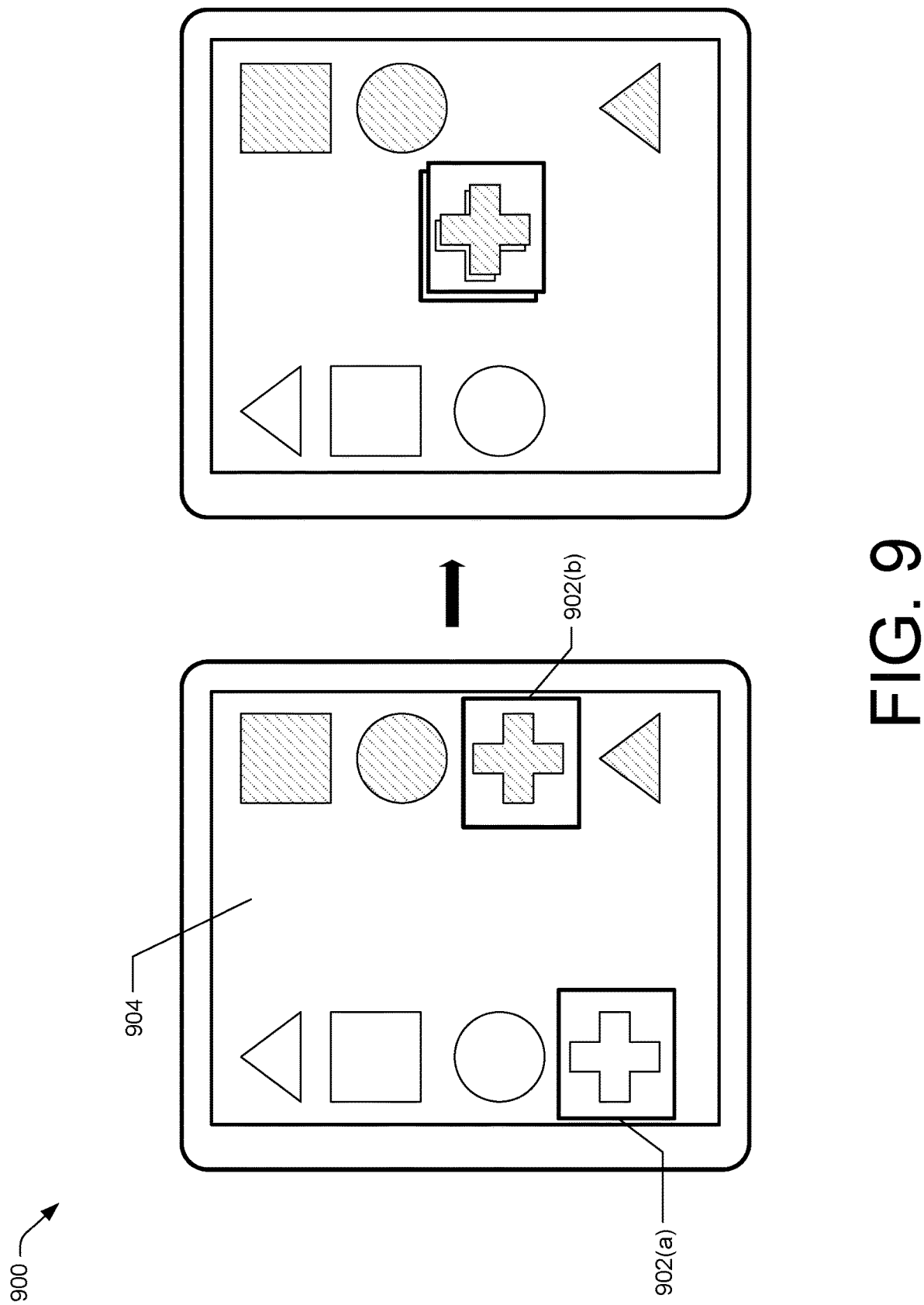
FIG. 9 illustrates another example user interface and interaction of example objects with the user interface.

FIG. 9 illustrates another example user interface 900 and interaction of example objects 902(a)-(b) with the user interface 900. FIG. 9 illustrates a progression, from left to right, of the user interface 900 as a user interacts therewith. The user interface 900 may be displayed on a surface 904, which may be similar to the surface 102 described above with respect to FIG. 1. FIG. 9 illustrates an example use of objects 902(a)-(b) and interaction of the objects 902(a)-(b) with the surface 904. As shown in FIG. 9, the content being presented on the surface 904 includes a shape-matching game, which the objects 902(a)-(b) may interact with.

By way of example, the content displayed on the surface 904 may include renderings of different-shaped holes and similarly-shaped pegs or objects. A user interacting with the surface may be instructed to put the pegs in the holes. The user may place one or more of the objects 902(a)-(b) onto the surface 904. The content may be presented based at least in part on at least one of the objects 902(a)-(b) being placed on the surface 904, and/or when an arrangement of at least one of the objects 902(a)-(b) has been identified and/or determined, and/or when a location of at least one of the objects 902(a)-(b) has been identified and/or determined, and/or when a shape of at least one of the objects 902(a)-(b) has been identified and/or determined. A user may move the object 902(a) to a portion of the surface 904 on which a hole or peg is displayed. Based at least in part on the object's 902(a) location being the same or substantially similar to a location of the surface 904 on which a hole or peg is displayed, the content displayed on the surface 904 may be updated. For example, the content may be dynamically updated when a user moves the object 902(a) such that the rendering of the hole or peg appears to move along with the object 902(a). In this way, the object 902(a) may be used to "grab" and "drag" the holes and/or pegs around the surface 904.

A second object 902(b) may be introduced to the surface 904 and may "grab" another hole and/or peg, as shown in FIG. 9. The user may then move one or more of the objects 902(a)-(b) into proximity with each other in a manner similar to how a user would move a physical peg toward a physical hole. The user may then stack one of the objects 902(a) on top of the other object 902(b). Based at least in part on the objects 902(a)-(b) being stacked, the content displayed on the surface 904 may be updated. Using the shape-matching game example provided herein, a user may stack a first object 902(a) on a second object 902(b). A local device and/or a remote system may detect that the first object 902(a) has been stacked on the second object 902(b).

For example, when the surface 904 includes force-sensing resistors, data indicating that one of the objects has been removed from the surface 904 and that a force associated with the other object has increased may indicate that the removed object has been stacked on the remaining object. Additionally, or alternatively, image data corresponding to light reflected off the surface 904 and/or the objects 902(a)-(b) may be analyzed to determine that the objects have been stacked. Additionally, or alternatively, the user may provide an indication to the local device that the objects have been stacked. Additionally, or alternatively, RFID information from RFID scanners associated with the surface 904 may determine that a location of the first object 902(a) is the same as or similar to a location of the second object 902(b), which may indicate that the objects have been stacked.

Using the shape-matching game example, based at least in part on an indication that the objects 902(a)-(b) have been stacked, the content displayed on the surface 904 may be updated. For example, if matching holes and pegs have been "grabbed" by the objects 902(a)-(b) and the objects 902(a)-(b) have been stacked on each other, the local device and/or the remote system may update the displayed content such that a rendering of the peg inside the hole may be displayed on the surface 904. This may indicate that the correct peg was placed in a given hole. It should be appreciated that the shape-matching game described herein is provided may way of example only and other uses and functionality of stacking objects is included in this disclosure.

Figure 10:
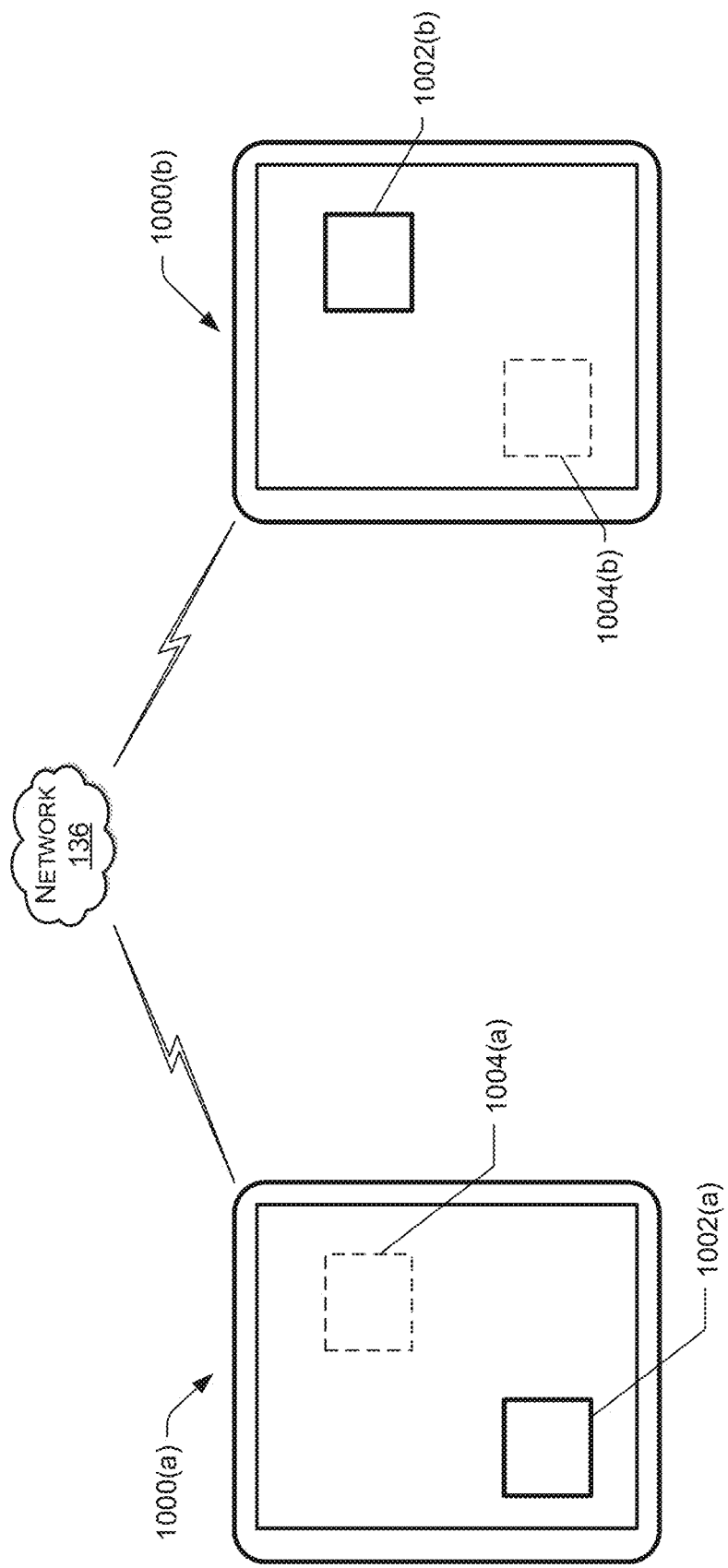
FIG. 10 illustrates multiple example systems interacting with objects.

FIG. 10 illustrates multiple example systems 1000(a)-(b) interacting with objects 1002(a)-(b). The systems 1000(a)-(b) may include the same or similar components as the system 100 described above with respect to FIG. 1. For example, each or both of the systems 1000(a)-(b) may include a surface, including some or all of the components of the surface 102 described with respect to FIG. 1, one or more projectors, one or more cameras, one or more mobile devices, and/or one or more communal devices. The systems 1000(a)-(b) may be connected via a network 136, which may have the same components and/or functionality as the network 136 from FIG. 1.

One or more objects may be associated with each of the systems 1000(a)-(b). For example, the object 1002(a) may be associated with the system 1000(a) and the object 1002(b) may be associated with the system 1000(b). A first user located in an environment of a first system 1000(a) may place the first object 1002(a) on a surface of the system 1000(a). The identity, location, and/or shape of the first object 1002(a) may be determined by the first system 1000(a) and/or a remote system. Additionally, a second user located in an environment of a second system 1000(b) may place the second object 1002(b) on a surface of the system 1000(b). The identity, location, and/or shape of the second object 1002(b) may be determined by the second system 1000(b) and/or a remote system.

In examples, the first system 1000(a) may be associated with the second system 1000(b). For example, the first system 1000(a) may be associated with a child located in a home while the second system 1000(b) may be associated with a parent or guardian located in an environment that is remote from the home. The two systems 1000(a)-(b) may be linked such that content, or a portion thereof, displayed on a surface of the first system 1000(a) may also be displayed on a surface of the second system 1000(b). Additionally, a first visual indication 1004(*a*) of the location of the second object 1002(*b*) may be displayed on the surface of the first system 1000(*a*). Additionally, or alternatively, a second visual indication 1004(*b*) of the location of the first object 1002(*a*) may be displayed on the surface of the second system 1000(*b*).

As the first user moves the first object 1002(*a*) on the surface of the first system 1000(*a*), the second visual indication 1004(*b*) may move on the surface of the second system 1000(*b*). Additionally, or alternatively, as the second user moves the second object 1002(*b*) on the surface of the second system 1000(*b*), the first visual indication 1004(*a*) may move on the surface of the first system 1000(*a*). In this way, the two users may be able to see the object movements by each other while using the systems. By way of example, a parent may be able to move his or her object to provide a visual guide to a child to assist with a learning application. Additionally, or alternatively, a communication channel may be established between the two systems 1000(*a*)-(*b*) such that the two users may communicate during use of the systems 1000(*a*)-(*b*).

Figure 11:
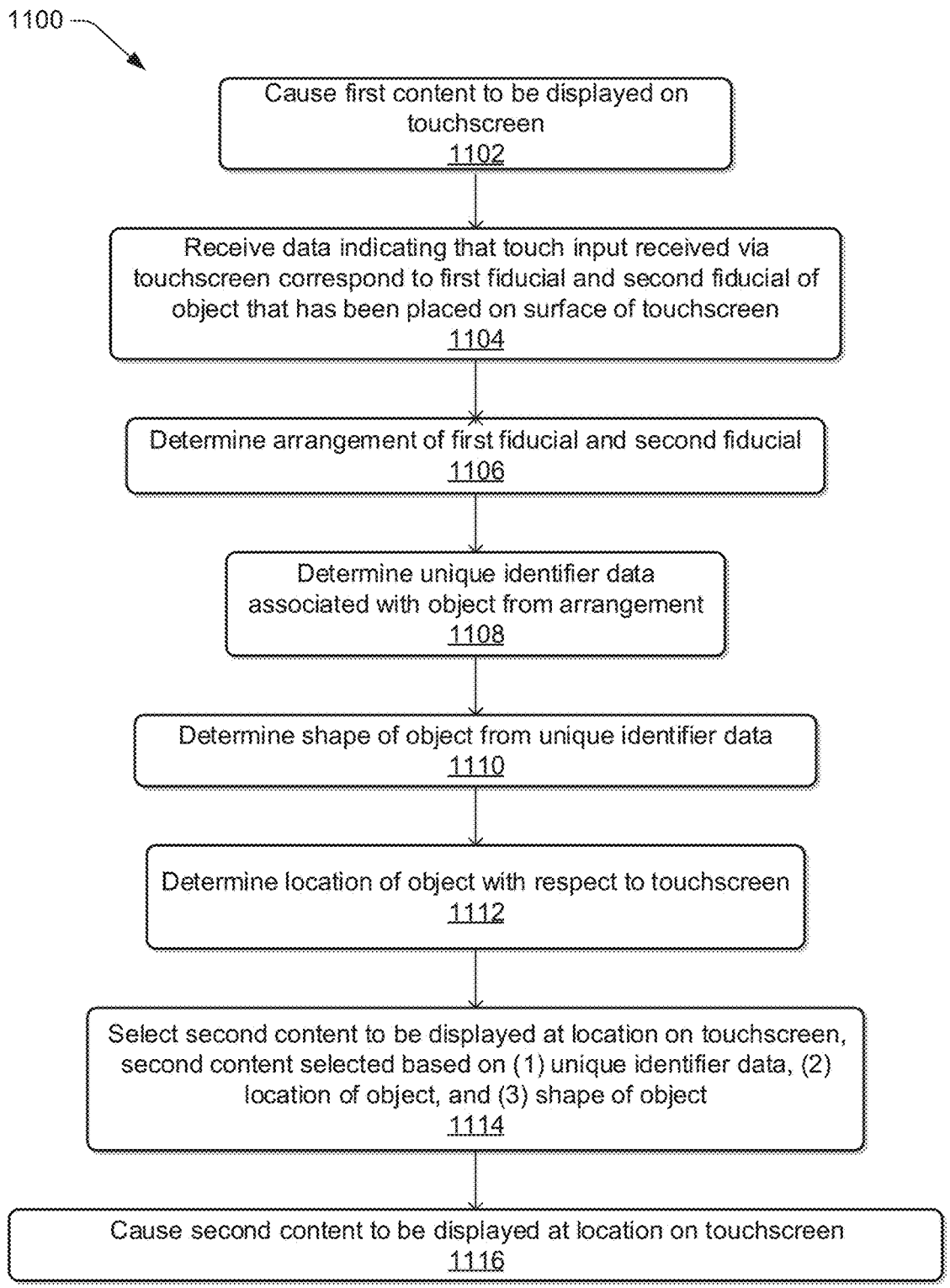
FIG. 11 illustrates a flow diagram of an example process for controlling displayed content using objects.
Figure 12:
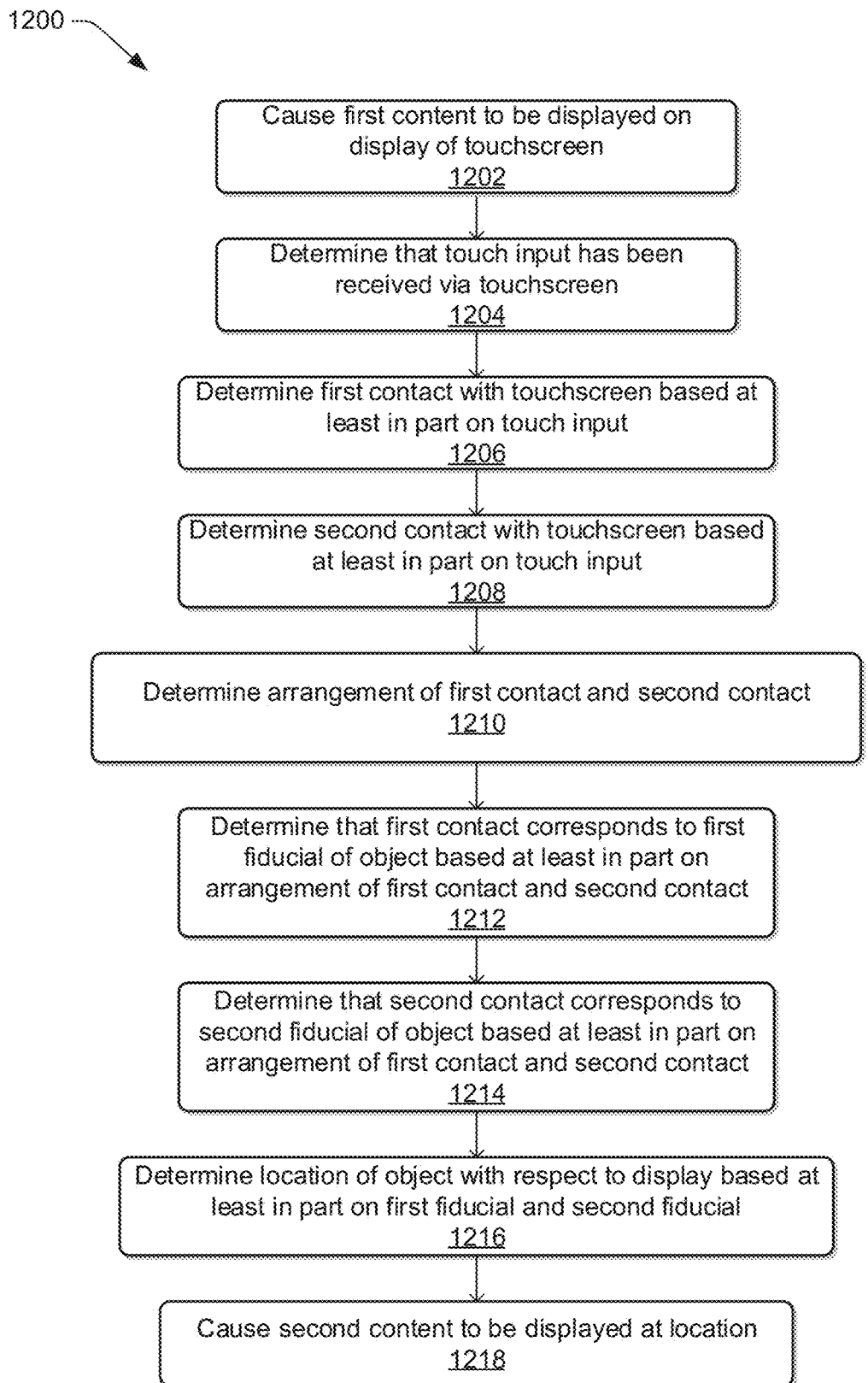
FIG. 12 illustrates a flow diagram of another example process for controlling displayed content using objects.
Figure 13:
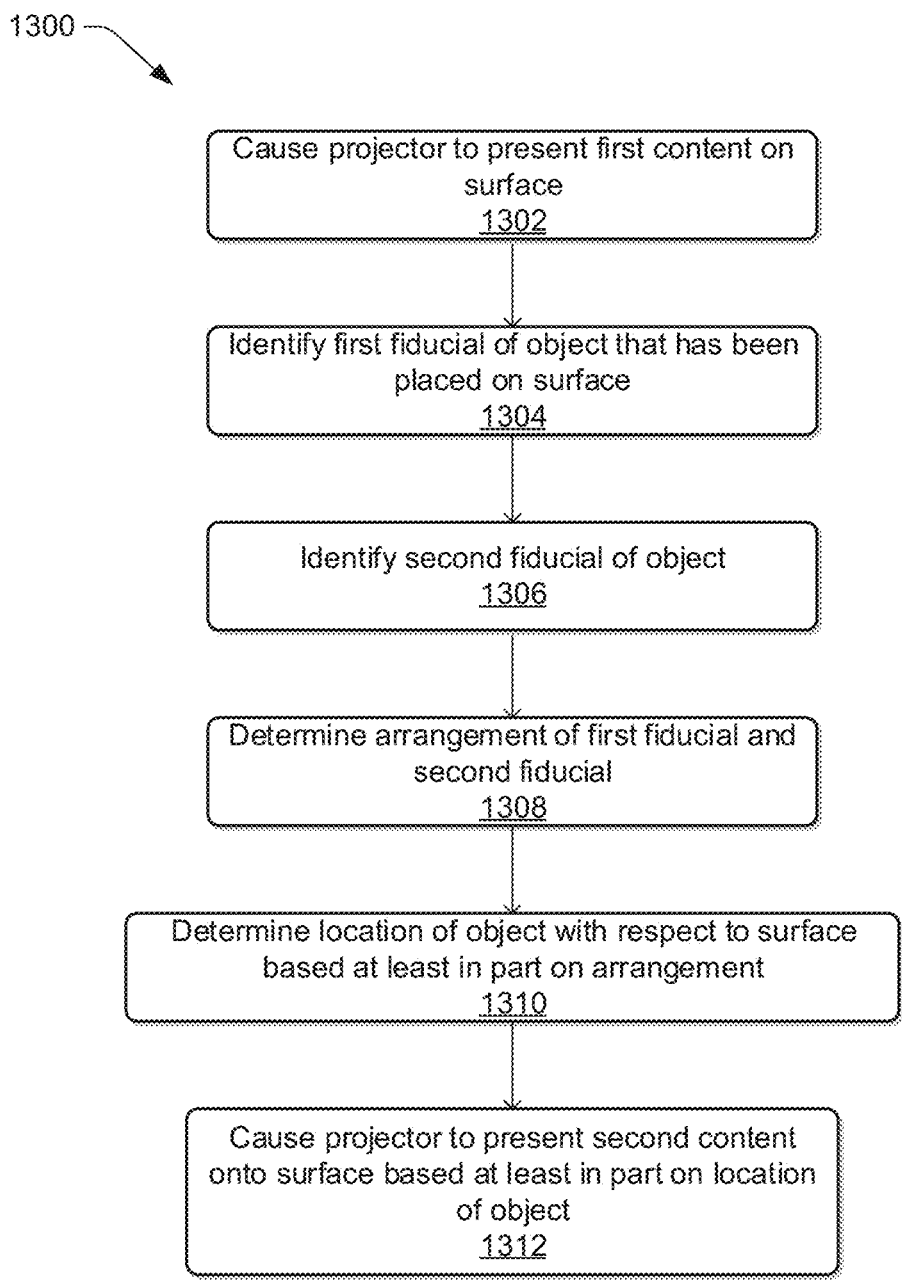
FIG. 13 illustrates a flow diagram of another example process for controlling displayed content using objects.

FIGS. 11-13 illustrate various processes for controlling content using objects. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-10, although the processes may be implemented in a wide variety of other environments, architectures and systems.

FIG. 11 illustrates a flow diagram of an example process 1100 for controlling displayed content using objects. The order in which the operations or steps are described is not intended to be construed as a limitation, and any number of the described operations may be combined in any order and/or in parallel to implement process 1100.

At block 1102, process 1100 may include causing first content to be displayed on a touchscreen. The first content may be displayed via the display, such as how a tablet computer displays content. The first content may be displayed based at least in part on a user command, which may be provided via tactile input, visual input, and/or an audible command. Additionally, or alternatively, the first content may be displayed based at least in part on detecting one or more touch inputs on the touchscreen.

Additionally, or alternatively, the first content may be displayed based at least in part on a computing device associated with the touchscreen determining that an object has been placed on the touchscreen, and/or determining an identity of the object, and/or determining a shape of the object, and/or determining an arrangement of fiducials of the object, and/or determining a location of the object with respect to the touchscreen. Additionally, or alternatively, the first content may be displayed based at least in part on a local device and/or a remote system determining that an object has been placed on the touchscreen, and/or determining an identity of the object, and/or determining a shape of the object, and/or determining an arrangement of fiducials of the object, and/or determining a location of the object with respect to the touchscreen. Additionally, or alternatively, a remote system with an established wireless connection to the touchscreen may cause the first content to be displayed.

At block 1104, the process 1100 may include receiving data indicating that touch input received via the touchscreen corresponds to at least a first fiducial and a second fiducial of an object that has been placed on a surface of the touchscreen. The touchscreen may include at least one of capacitive touch sensors or force-sensing resistors. Receiving touch inputs may be based on data received by one or more of the capacitive touch sensors and/or one or more of the force-sensing resistors, for example. With respect to the capacitive touch sensors, contact by an object may cause a capacitance. Contact by a fiducial on the capacitive touch sensor may cause a given capacitance, which may cause the generation of data indicating that a touch has occurred at or near the location of the capacitive touch sensor. With respect to the force-sensing resistors, contact by an object may cause a resistance. Contact by a fiducial on the force-sensing resistor may cause a given resistance, which may cause the generation of data indicating that a touch has occurred at or near the location of the force-sensing resistor. The force-sensing resistor may sense changes in a resistive value associated therewith depending on how much the resistor is pressed, these changes in resistive value may be correlated to the amount of force applied.

The process 1100 may include determining a number of contacts with the touchscreen caused by the fiducials. Determining the number of contacts may be based at least in part on the touch input data received via the capacitive touch sensors and/or the force-sensing resistors. In examples, some touch inputs may correspond to fiducials of an object while other touch inputs, such as inputs caused by a finger, for example, will not correspond to the fiducials of the object. In these examples, the fiducials may be constructed of a material that generates a different capacitance when in contact with the display than the capacitance caused by a finger touching the display.

At block 1106, the process 1100 may include determining an arrangement of the fiducials. Determining the arrangement of the fiducials may include determining a distance between fiducials and/or an orientation of fiducials with respect to each other. For example, if an object has three fiducials, the three fiducials may be disposed at three locations with respect to the object. A distance between the first fiducial and the second fiducial, between the first fiducial and the third fiducial, and/or between the second fiducial and the third fiducial may be determined. The distances may be determined based at least in part on the touch inputs corresponding to contact on the display by the fiducials. By way of example, on a given surface, an x,y-coordinate system may be applied to the surface for mapping purposes. A first touch input corresponding to contact by the first fiducial may have a first x,y coordinate, the second touch input corresponding to contact by the second fiducial may have a second x,y coordinate, and the third touch input corresponding to contact by the third fiducial may have a third x,y coordinate. The x,y coordinates of the touch inputs may be compared to determine a distance between touch inputs. It should be appreciated that while distance determination is described herein as being performed using an x,y-coordinate system, other means of determining distance may be utilized.

With respect to determining the orientation of fiducials with respect to each other, directional data may be determined for a line formed by connection of two points corresponding to two touch inputs by the fiducials. Directional data may be determined for a line associated the first fiducial and the second fiducial, for a line associated with the first fiducial and the third fiducial, and/or for a line associated with the second fiducial and the third fiducial. The directional data may be utilized to determine how the fiducials are oriented with respect to each other.

Additionally, or alternatively, in instances where the system also includes a projector, the objects may include physical fiducials located on a side of the object opposite the side in contact with the surface. Light from the projector may hit the surface and the fiducials. The fiducials may be configured to reflect light in a manner that differs from how light is reflected by the surface and/or other portions of the object. The light reflected by the fiducials may be captured by one or more cameras, which may generate corresponding image data. The image data may be analyzed and the portions of the image data corresponding to the light reflected off the fiducials may be identified. Using this information, the number of fiducials may be identified, distances between the fiducials may be determined, and directional data associated with the fiducials may be determined.

Additionally, or alternatively, the projector may project a light array onto the surface. A portion of the light array may hit the fiducials, which may cause distortion of the light array in a manner that differs from distortion, if any, caused by the surface and/or other components of the object. The cameras may capture the distorted light reflected off the fiducials and generate corresponding image data. The distorted light may be identified by analysis of the image data to identify the number of fiducials and/or their arrangement.

Additionally, or alternatively, the fiducials may include lighting elements that emit light. The lighting elements of the fiducials may be configured to output light at a given wavelength and/or modulation that differs from light reflected off the surface and/or other components of the object. The cameras may capture the light output by the light elements of the fiducials and generate corresponding image data. The image data may be analyzed and the number of fiducials and their arrangement with respect to each other may be determined.

Additionally, or alternatively, the objects may be configured to send data to the device having the surface and/or the projector that indicates an arrangement of the fiducials. For example, the objects may send data via the network interfaces described above via, for example, Bluetooth protocol. The data may be received by the device having the surface and/or the projector, a mobile device, and/or a communal device. The data may indicate the number of fiducials associated with the object and/or the orientation of the fiducials with respect to each other.

At block 1110, the process 1100 may include determining unique identifier data associated with the object from the number of the contacts and/or the arrangement of the fiducials. The unique identifier data may be utilized to determine an identity of the object. For example, the arrangement data may be utilized to determine the identity of the object and/or a type of object. By way of example, a given object may include a unique arrangement of fiducials. Data representing the unique arrangement of the fiducials may be stored in a database along with an identifier corresponding to the object. When an object is placed on the surface and the arrangement of the fiducials of the object is determined, the arrangement may be compared to the stored arrangement data. When the detected arrangement of fiducials matches or substantially matches the stored arrangement data of a previously-used object and/or an object for which arrangement data is already known, a determination may be made that the object currently placed on the surface is to be identified as the previously-used or already-known object.

By way of example, if an object has two fiducials, a distance between a first contact with the display and a second contact with the display may be determined. Additionally, directional data associated with the first contact and the second contact may be determined. The determined distance may be analyzed with respect to a reference distance associated with a previously-identified object, and the determined directional data may be analyzed with respect to reference directional data associated with a previously-identified object. Determining the identity of the object may include determining that the determined distance matches or substantially matches the reference distance and/or that the determined directional data matches or substantially matches the reference directional data.

By way of example, objects may come in various shapes and sizes, and even in examples where two objects have the same shape and/or size, each of the two objects may have different fiducial arrangements such that each object's fiducial arrangement is unique. When an object is placed on the surface, the arrangement of the fiducials may be determined and corresponding arrangement data may be stored in a database along with an identifier of the object. Thereafter, when the object is placed on the surface, the arrangement of the object may be determined and compared to the stored arrangement data. Since, in this example, the stored arrangement data will match the detected arrangement, it may be determined that the object placed on the surface is the previously-used object. Additionally, or alternatively, object identifications may be determined based at least in part on an application being utilized and/or the content being displayed. For example, a card-playing application may be sold with or otherwise be associated with one or more objects. Accessing and/or using the application may result in arrangement data associated with the objects being stored in the database or otherwise accessible to determine object identity.

Additionally, or alternatively, data other than arrangement data of fiducials may be utilized to identify an object. For example, in examples where an object includes a sound emitter, the object may be configured to emit sound at a specific frequency and/or range of frequencies that may be unique to the object and/or the type of object. Additionally, or alternatively, the object may be configured to modulate emitted sound with a unique modulation to the object and/or the type of object. Microphones of the device having the display and/or a projector may capture the sound and generate corresponding audio data. That audio data may be compared to reference audio data for reference sound associated with objects. The object may be identified by matching or substantially matching the reference sound with the detected sound.

Additionally, or alternatively, in examples where the object includes a light element, the object may be configured to emit light at a specific wavelength and/or range of wavelengths that may be unique to the object and/or the type of object. Additionally, or alternatively, the object may be configured to modulate emitted light with a unique modulation to the object and/or the type of object. The cameras of the device having the display and/or the projector may capture images including the emitted light and generate corresponding image data. The image data may be compared to reference image data associated with objects. The object may be identified by matching or substantially matching the reference image data with the detected image data.

Additionally, or alternatively, data from RFID components of the objects and the device having the display and/or the projector may be utilized to identify an object. For example, RFID scanners associated with the display may be utilized to scan RFID tags of the objects. The RFID tags may provide a unique identifier of the object and/or the type of object to the RFID scanner. Additionally, or alternatively, QR scanners and tags may be utilized in a similar manner to RFID scanners and tags to determine the identity of an object.

At block 1110, the process 1100 may include determining a shape of the object from the unique identifier data. For example, the touch input information described above may be utilized to determine the shape of the object. By way of example, the object may be configured with fiducials that are disposed on corners and/or edges of the object. The orientation of the fiducials may be determined and that information may be utilized to determine the outline and/or boundary of the object. This information may be utilized to determine the shape of the object. By way of example, an object may have a square shape with one fiducial disposed in each of the four corners of the object along with, in some examples, additional fiducials disposed on the border of the object. Once placed on the display, the orientation of the fiducials may be determined. Here, the orientation of the fiducials is at equal distances from each other and each arrangement of any three of the four fiducials is at a 90-degree angle. Based at least in part on the arrangement information, it may be determined that the shape of the object is a square.

Additionally, or alternatively, in examples where the object includes an RFID tag, RFID scanners of the device having the display and/or the projector may scan the RFID tag, which may provide an identifier of the object. The identifying information may additionally include an indication of the shape of the object. This information may be utilized to identify the shape of the object. Additionally, or alternatively, in examples where the object includes a QR code, QR code scanners of the device having the display and/or the projector may scan the QR code, which may provide an identifier of the object. The identifying information may additionally include an indication of the shape of the object. This information may be utilized to identify the shape of the object.

Additionally, or alternatively, image data may be utilized that is captured by one or more cameras to determine the shape of the object. For example, images representing the display and the object placed thereon may be captured by the one or more cameras, which may generate corresponding image data. The image data may be analyzed to determine the boundary of the object, which may be utilized to determine the shape of the object.

At block 1112, the process 1100 may include determining a location of the object with respect to the touchscreen. The determination of the location may be based at least in part on the shape of the object and/or the contacts. One or more methods may be utilized to determine the location of the object. For example, the touch input information may be utilized to determine x,y coordinates of touches that correspond to fiducials of the object. Based at least in part on these touch inputs, and, in examples, the identity of the object, the location of the object with respect to the display may be determined.

Additionally, or alternatively, the RFID information described above may be utilized to determine the location of the object. For example, an object may have an RFID tag associated with it. A first RFID scanner associated with the display may scan the RFID tag of the object, which may indicate a first distance between the first RFID scanner and the RFID tag. A second RFID scanner associated with the display may scan the RFID tag of the object, which may indicate a second distance between the second RFID scanner and the RFID tag. In examples where the two RFID scanners are disposed in adjacent corners, the first distance and the second distance may be compared to determine the location of the RFID tag associated with the object. The location of the RFID tag, along with the identity of the object as determined by, for example, the RFID tag, may be utilized to determine the location of the object. Additionally, or alternatively, the QR code information described above may be utilized in a manner similar to the use of RFID information.

Additionally, or alternatively, time-difference-of-arrival data may be utilized to determine the location of the object. For example, where the object includes one or more sound emitters, the sound emitters may produce sound, which may be captured by two or more microphones of the device having the display and/or the projector. A time at which each of the microphones receives the sound may be determined and a time-difference-of-arrival calculation may be performed to determine the differences in time at which the sound arrived at the microphones. This information may be utilized to determine a distance from each of the microphones to the sound emitter, which may be utilized to determine a location of the sound emitter and thus a location of the object.

Additionally, or alternatively, image data captured by one or more cameras may be utilized to determine the location of the object. For example, images representing the display and the object placed thereon may be captured by the one or more cameras, which may generate corresponding image data. The image data may be analyzed to determine where portions of the image corresponding to the object are located.

At block 1114, the process 1100 may include selecting second content to be displayed at the location on the touchscreen. The second content may be selected based at least in part on at least one of the unique identifier data, the location of the object, or the shape of the object. By way of example, the content displayed on the touchscreen may include a game. The game may present a number of letters and/or numbers on the screen along with a visual and/or audible instruction to select a given letter or number, such as the number "5." The user may place the object on the screen and may slide or otherwise place the object such that the number "5" is framed by the border of the object. If the user successfully navigates the object to the "5," as determined from the location of the object for example, second content may be selected reflecting that the user has chosen the correct number. For example, a visual indication that the user has chosen the correct number may be selected, such as "Congratulations!"

At block 1116, the process 1100 may include causing second content to be displayed at the location on the touchscreen. Continuing with the example from block 1116, the visual indication may be displayed within the border of the object and/or on other portions of the screen. Additionally, or alternatively, audio may be output by one or more speakers associated with the screen based at least in part on the object's location. For example, the audio may provide an audible indication that the user has successfully navigated the object to the "5."

The process 1100 may additionally, or alternatively, include receiving second data indicating that second touch input received via the touchscreen corresponds to fiducials of a second object that has been placed on the surface. The process 1100 may also include determining a second location of the second object based at least in part on the fiducials and determining that the first location is within a threshold distance from the second location. Based at least in part on determining that the first location is within a threshold distance from the second location, the process 1100 may additionally include causing third content to be displayed at at least one of the first location or the second location.

By way of example, one or more renderings of puzzle pieces may be displayed on the surface. The objects may be utilized to "grab" a puzzle piece and move that puzzle piece around the surface and/or into proximity with other puzzle pieces. A user may move the first object to a portion of the surface on which a puzzle piece is displayed. A second object may be introduced to the surface and may "grab" another puzzle piece. The user may then move one or more of the objects into proximity with each other in a manner similar to how a user would move two physical puzzle pieces together. Based at least in part on the objects being within a threshold distance of each other, the third content may be displayed on the surface. Using the puzzle-game example provided herein, a user may move a first object toward a second object such that the first object is touching or is nearly touching the second object. Based at least in part on the proximity of the two objects being within a threshold distance from each other, a local device and/or a remote system associated with the surface may update the content displayed on the surface. Here, for example, the content displayed on the surface may be updated such that the two puzzle piece renderings may appear to be connected to each other. Additionally, or alternatively, a determination that two or more objects are within a threshold distance from each other may enable and/or disable functionality of the surface, the objects, the local device, the remote system, and/or an application being utilized in connection with the objects.

The process 1100 may additionally include receiving second data indicating that contact by the fiducials of the object with the touchscreen has ceased. This data may represent that the object has been removed from the surface of the display. The process 1100 may also include receiving third data indicating that second touch input has been received via the touchscreen and that those touch input corresponds to additional fiducials. A second arrangement of the additional fiducials may be determined. The second arrangement of the additional fiducials may be utilized to determine that the second fiducials are associated with a second side of the object. By so doing, it may be determined that the object has been flipped such that a second side of the object is now in contact with the surface of the display. Based at least in part on determining that the object has been flipped, third content may be caused to be displayed on the surface.

By way of example, playing cards may be displayed on the surface. A user may be directed to match the playing cards to complete the game. A user may move one or more of the objects toward portions of the surface on which the playing cards have been displayed. A user may flip the object over such that the first side of the object that was not in contact with the surface is now in contact with the surface. One or more fiducials of the first side may differ from fiducials of the other side of the object. Touch inputs associated with the fiducials of the second side may be detected and utilized to determine that the object has been flipped over. Data indicating that the object has been flipped over may be utilized to cause display of the second content. In other words, flipping the object may cause the rendering of the playing card to "flip over."

FIG. 12 illustrates a flow diagram of another example process 1200 for controlling displayed content using objects. The order in which the operations or steps are described is not intended to be construed as a limitation, and any number of the described operations may be combined in any order and/or in parallel to implement process 1200.

At block 1202, process 1200 may include causing first content to be displayed on a display of a touchscreen. The display may include a touchscreen and the first content may be displayed via the display, such as how a tablet computer displays content. The first content may be displayed based at least in part on a user command, which may be provided via tactile input, visual input, and/or an audible command. Additionally, or alternatively, the first content may be displayed based at least in part on detecting one or more touch inputs on the display.

Additionally, or alternatively, the first content may be displayed based at least in part on a computing device associated with the display determining that an object has been placed on the display, and/or determining an identity of the object, and/or determining a shape of the object, and/or determining an arrangement of fiducials of the object, and/or determining a location of the object with respect to the display. Additionally, or alternatively, the first content may be displayed based at least in part on a local device and/or a remote system determining that an object has been placed on the display, and/or determining an identity of the object, and/or determining a shape of the object, and/or determining an arrangement of fiducials of the object, and/or determining a location of the object with respect to the display. Additionally, or alternatively, a remote system with an established wireless connection to the display may cause the first content to be displayed.

At block 1204, the process 1200 may include determining that touch input has been received via the touchscreen. The display may include at least one of capacitive touch sensors or force-sensing resistors. Receiving touch inputs may be based on data received by one or more of the capacitive touch sensors and/or one or more of the force-sensing resistors, for example. With respect to the capacitive touch sensors, contact by an object may cause a capacitance. Contact by a fiducial on the capacitive touch sensor may cause a given capacitance, which may cause the generation of data indicating that a touch has occurred at or near the location of the capacitive touch sensor. With respect to the force-sensing resistors, contact by an object may cause a resistance. Contact by a fiducial on the force-sensing resistor may cause a given resistance, which may cause the generation of data indicating that a touch has occurred at or near the location of the force-sensing resistor. The force-sensing resistor may sense changes in a resistive value associated therewith depending on how much the resistor is pressed, these changes in resistive value may be correlated to the amount of force applied.

At block 1206, the process 1200 may include determining a first contact with the touchscreen based at least in part on the touch input. Determining the first contact may be based at least in part on the touch input data received via the capacitive touch sensors and/or the force-sensing resistors. In examples, some touch inputs may correspond to fiducials of an object while other touch inputs, such as inputs caused by a finger, for example, will not correspond to the fiducials of the object. In these examples, the fiducials may be constructed of a material that generates a different capacitance when in contact with the display than the capacitance caused by a finger touching the display.

At block 1208, the process 1200 may include determining a second contact with the touchscreen based at least in part on the touch input. Determining the second contact may be performed in the same or a similar manner as determining the first contact, as described with respect to block 1206.

At block 1210, the process 1200 may include determining an arrangement of the contacts. The arrangement may be based at least in part on at least one of (1) a distance between a first contact of the contacts and a second contact of the contacts or (2) directional data associated with the first contact and the second contact. For example, a distance between the first contact and the second contact may be determined. The distance may be determined based at least in part on the touch inputs corresponding to contact on the display. By way of example, on a given surface, an x,y-coordinate system may be applied to the surface for mapping purposes. A first touch input corresponding to the first contact may have a first x,y coordinate and the second touch input corresponding to the second contact may have a second x,y coordinate. The x,y coordinates of the touch inputs may be compared to determine a distance between touch inputs. It should be appreciated that while distance determination is described herein as being performed using an x,y-coordinate system, other means of determining distance may be utilized.

With respect to determining the orientation of contacts with respect to each other, directional data may be determined for a line formed by connection of two points corresponding to two touch inputs. Directional data may be determined for a line associated the first contact and the second contact. The directional data may be utilized to determine how the contacts are oriented with respect to each other.

At block 1212, the process 1200 may include determining that the first contact corresponds to a first fiducial of the object based at least in part on the arrangement of the first contact and the second contact. For example, contacts made by fiducials may cause a capacitance that differs from a capacitance caused by contact of other objects, such as a human finger. Additionally, or alternatively, contacts made by fiducials may cause a resistance that differs from a resistance caused by contact of other objects. Additionally, or alternatively, when the number of the contacts is greater than a number of contacts made by objects other than fiducials, such as five contacts made by fingers of a hand, this information may be utilized to determine that the contacts were caused by fiducials of an object. Other data may be utilized to determine when contacts are caused by fiducials.

For example, in instances where the system also includes a projector, the objects may include physical fiducials located on a side of the object opposite the side in contact with the surface. Light from the projector may hit the surface and the fiducials. The fiducials may be configured to reflect light in a manner that differs from how light is reflected by the surface and/or other portions of the object. The light reflected by the fiducials may be captured by one or more cameras, which may generate corresponding image data. The image data may be analyzed and the portions of the image data corresponding to the light reflected off the fiducials may be identified. Using this information, the number of fiducials may be identified, distances between the fiducials may be determined, and directional data associated with the fiducials may be determined. This information may be utilized to determine and/or confirm that the contacts on the touchscreen are caused by fiducials of an object.

Additionally, or alternatively, the projector may project a light array onto the surface. A portion of the light array may hit the fiducials, which may cause distortion of the light array in a manner that differs from distortion, if any, caused by the surface and/or other components of the object. The cameras may capture the distorted light reflected off the fiducials and generate corresponding image data. The distorted light may be identified by analysis of the image data to identify the number of fiducials and/or their arrangement.

Additionally, or alternatively, the fiducials may include lighting elements that emit light. The lighting elements of the fiducials may be configured to output light at a given wavelength and/or modulation that differs from light reflected off the surface and/or other components of the object. The cameras may capture the light output by the light elements of the fiducials and generate corresponding image data. The image data may be analyzed and the number of fiducials and their arrangement with respect to each other may be determined.

Additionally, or alternatively, the objects may be configured to send data to the device having the surface and/or the projector that indicates an arrangement of the fiducials. For example, the objects may send data via the network interfaces described above via, for example, Bluetooth protocol. The data may be received by the device having the surface and/or the projector, a mobile device, and/or a communal device. The data may indicate the number of fiducials associated with the object and/or the orientation of the fiducials with respect to each other. Some or all of this data may be utilized to determine that touch inputs correspond to touches by fiducials of an object.

At block 1214, the process 1200 may include determining that the second contact corresponds to a second fiducial of the object. Determining that the second contact corresponds to the second fiducial may be perform in the same or a similar manner as determining that the first contact corresponds to the first fiducial, as described with respect to block 1212.

At block 1216, the process 1200 may include determining a location of the object with respect to the display based at least in part on the first fiducial and second fiducial. The determination of the location may be based at least in part on the shape of the object and/or the contacts. One or more methods may be utilized to determine the location of the object. For example, the touch input information may be utilized to determine x,y coordinates of touches that correspond to fiducials of the object. Based at least in part on these touch inputs, and, in examples, the identity of the object, the location of the object with respect to the display may be determined.

Additionally, or alternatively, the RFID information described above may be utilized to determine the location of the object. For example, an object may have an RFID tag associated with it. A first RFID scanner associated with the display may scan the RFID tag of the object, which may indicate a first distance between the first RFID scanner and the RFID tag. A second RFID scanner associated with the display may scan the RFID tag of the object, which may indicate a second distance between the second RFID scanner and the RFID tag. In examples where the two RFID scanners are disposed in adjacent corners, the first distance and the second distance may be compared to determine the location of the RFID tag associated with the object. The location of the RFID tag, along with the identity of the object as determined by, for example, the RFID tag, may be utilized to determine the location of the object. Additionally, or alternatively, the QR code information described above may be utilized in a manner similar to the use of RFID information.

Additionally, or alternatively, time-difference-of-arrival data may be utilized to determine the location of the object. For example, where the object includes one or more sound emitters, the sound emitters may produce sound, which may be captured by two or more microphones of the device having the display and/or the projector. A time at which each of the microphones receives the sound may be determined and a time-difference-of-arrival calculation may be performed to determine the differences in time at which the sound arrived at the microphones. This information may be utilized to determine a distance from each of the microphones to the sound emitter, which may be utilized to determine a location of the sound emitter and thus a location of the object.

Additionally, or alternatively, image data captured by one or more cameras may be utilized to determine the location of the object. For example, images representing the display and the object placed thereon may be captured by the one or more cameras, which may generate corresponding image data. The image data may be analyzed to determine where portions of the image corresponding to the object are located.

At block 1218, the process 1200 may include causing second content to be displayed at the location. The second content may be selected based at least in part on at least one of the identity of the object, the location of the object, or the shape of the object. By way of example, the content displayed on the touchscreen may include a game. The game may present a number of letters and/or numbers on the screen along with a visual and/or audible instruction to select a given letter or number, such as the number "5." The user may place the object on the screen and may slide or otherwise place the object such that the number "5" is framed by the border of the object. If the user successfully navigates the object to the "5," as determined from the location of the object for example, second content may be selected reflecting that the user has chosen the correct number. For example, a visual indication that the user has chosen the correct number may be selected, such as "Congratulations!" The visual indication may be displayed within the border of the object and/or on other portions of the screen. Additionally, or alternatively, audio may be output by one or more speakers associated with the screen based at least in part on the object's location. For example, the audio may provide an audible indication that the user has successfully navigated the object to the "5."

The process 1200 may also include receiving first data via at least one force sensor of the touchscreen. The data may indicate contact by the fiducials with the touchscreen at a first force. The process 1200 may also include receiving second data via the force sensor indicating contact by the fiducials with the touchscreen at a second force. Based at least in part on the second data, the process 1200 may include determining that at least a portion of the object has been pressed. For example, the object may include a button or other actuatable portion and/or the content displayed with respect to the object may include a rendering of a button or other selectable portion. A user may press the button or button rendering on the object and the press of the object may cause the resistors to detect the second force. The process 1200 may additionally include causing a device associated with the touchscreen to perform an action based at least in part on determining that the at least the portion of the object has been pressed. It should be understood that while pressing a button is used to illustrate user interaction with the object, other types of user interaction are also disclosed, such as one or more finger motions, taps, zooming gestures, and/or swiping gestures, for example.

The process 1200 may additionally include determining a shape of the object based at least in part on determining a first location of the first fiducial and a second location of the second fiducial. For example, the touch input information described above may be utilized to determine the shape of the object. By way of example, the object may be configured with fiducials that are disposed on corners and/or edges of the object. The orientation of the fiducials may be determined and that information may be utilized to determine the outline and/or boundary of the object. This information may be utilized to determine the shape of the object. By way of example, an object may have a square shape with one fiducial disposed in each of the four corners of the object along with, in some examples, additional fiducials disposed on the border of the object. Once placed on the display, the orientation of the fiducials may be determined. Here, the orientation of the fiducials is at equal distances from each other and each arrangement of any three of the four fiducials is at a 90-degree angle. Based at least in part on the arrangement information, it may be determined that the shape of the object is a square.

Additionally, or alternatively, in examples where the object includes an RFID tag, RFID scanners of the device having the display and/or the projector may scan the RFID tag, which may provide an identifier of the object. The identifying information may additionally include an indication of the shape of the object. This information may be utilized to identify the shape of the object. Additionally, or alternatively, in examples where the object includes a QR code, QR code scanners of the device having the display and/or the projector may scan the QR code, which may provide an identifier of the object. The identifying information may additionally include an indication of the shape of the object. This information may be utilized to identify the shape of the object.

Additionally, or alternatively, image data may be utilized that is captured by one or more cameras to determine the shape of the object. For example, images representing the display and the object placed thereon may be captured by the one or more cameras, which may generate corresponding image data. The image data may be analyzed to determine the boundary of the object, which may be utilized to determine the shape of the object.

The process 1200 may additionally include receiving second data indicating that contact by the fiducials of the object with the display has ceased. This data may represent that the object has been removed from the surface of the display. The process 1200 may also include receiving third data indicating that second touch input has been received via the display and that those touch inputs correspond to additional fiducials. A second arrangement of the additional fiducials may be determined. The second arrangement of the additional fiducials may be utilized to determine that the additional fiducials are associated with a second side of the object. By so doing, it may be determined that the object has been flipped such that a second side of the object is now in contact with the surface of the display. Based at least in part on determining that the object has been flipped, third content may be caused to be displayed on the surface.

By way of example, playing cards may be displayed on the surface. A user may be directed to match the playing cards to complete the game. A user may move one or more of the objects toward portions of the surface on which the playing cards have been displayed. A user may flip the object over such that the first side of the object that was not in contact with the surface is now in contact with the surface. One or more fiducials of the first side may differ from fiducials of the other side of the object. Touch inputs associated with the fiducials of the second side may be detected and utilized to determine that the object has been flipped over. Data indicating that the object has been flipped over may be utilized to cause display of the second content. In other words, flipping the object may cause the rendering of the playing card to "flip over."

The process 1200 may also include determining that two objects have been stacked on each other. For example, the process 1200 may include identifying, based at least in part on first force data received via a force sensor of the touchscreen, a first force associated with contact by a first object with the touchscreen. The process 1200 may also include receiving second force data via the force sensor, the second force data indicating a second force associated with the contact by the first object with the touchscreen. The process 1200 may also include determining that a second object has been stacked on the first object based at least in part on the second force and causing third content to be displayed based at least in part on determining that the second object has been stacked on the first object. Additionally, or alternatively, image data corresponding to light reflected off the surface and/or the objects may be analyzed to determine that the objects have been stacked. Additionally, or alternatively, the user may provide an indication to the local device that the objects have been stacked.

FIG. 13 illustrates a flow diagram of another example process 1300 for controlling displayed content using objects. The order in which the operations or steps are described is not intended to be construed as a limitation, and any number of the described operations may be combined in any order and/or in parallel to implement process 1300.

At block 1302, process 1300 may include causing a projector to present first content on a surface. The first content may be presented based at least in part on a user command, which may be provided via tactile input, visual input, and/or an audible command. Additionally, or alternatively, the first content may be presented based at least in part on detecting one or more objects in a view of a camera associated with the projector.

Additionally, or alternatively, the first content may be presented based at least in part on a computing device associated with the surface determining that an object has been placed on the surface, and/or determining an identity of the object, and/or determining a shape of the object, and/or determining an arrangement of fiducials of the object, and/or determining a location of the object with respect to the surface. Additionally, or alternatively, the first content may be presented based at least in part on a local device and/or a remote system determining that an object has been placed on the surface, and/or determining an identity of the object, and/or determining a shape of the object, and/or determining an arrangement of fiducials of the object, and/or determining a location of the object with respect to the surface. Additionally, or alternatively, a remote system with an established wireless connection to the display may cause the first content to be presented.

At block 1304, the process 1300 may include identifying a first fiducial of an object that has been placed on the surface. For example, the surface may include at least one of capacitive touch sensors or force-sensing resistors. Touch input may be received on the surface and may be identified based on data received by one or more of the capacitive touch sensors and/or one or more of the force-sensing resistors, for example. With respect to the capacitive touch sensors, contact by an object may cause a capacitance. Contact by a fiducial on the capacitive touch sensor may cause a given capacitance, which may cause the generation of data indicating that a touch has occurred at or near the location of the capacitive touch sensor. With respect to the force-sensing resistors, contact by an object may cause a resistance. Contact by a fiducial on the force-sensing resistor may cause a given resistance, which may cause the generation of data indicating that a touch has occurred at or near the location of the force-sensing resistor. The force-sensing resistor may sense changes in a resistive value associated therewith depending on how much the resistor is pressed, these changes in resistive value may be correlated to the amount of force applied.

In examples, the objects may include physical fiducials located on a side of the object opposite the side in contact with the surface. Light from the projector may hit the surface and the fiducials. The fiducials may be configured to reflect light in a manner that differs from how light is reflected by the surface and/or other portions of the object. The light reflected by the fiducials may be captured by one or more cameras, which may generate corresponding image data. The image data may be analyzed and the portions of the image data corresponding to the light reflected off the fiducials may be identified. Using this information, the number of fiducials may be identified, distances between the fiducials may be determined, and directional data associated with the fiducials may be determined. This information may be utilized to determine and/or confirm that the contacts on the surface are caused by fiducials of an object.

Additionally, or alternatively, the projector may project a light array onto the surface. A portion of the light array may hit the fiducials, which may cause distortion of the light array in a manner that differs from distortion, if any, caused by the surface and/or other components of the object. The cameras may capture the distorted light reflected off the fiducials and generate corresponding image data. The distorted light may be identified by analysis of the image data to identify the number of fiducials and/or their arrangement.

At block 1306, the process 1300 may include identify a second fiducial of the object. Identifying the second fiducial may be perform in the same or a similar manner as identifying the first fiducial, as described with respect to block 1304.

At block 1308, the process 1300 may include determining an arrangement of first fiducial and the second fiducial. The arrangement may be based at least in part on at least one of (1) a distance between fiducials or (2) directional data associated with the fiducials. For example, when an object has two fiducials, a distance between the first fiducial and the second fiducial may be determined. The distance may be determined based at least in part on the touch inputs corresponding to contact on the display by the fiducials. By way of example, on a given surface, an x,y-coordinate system may be applied to the surface for mapping purposes. A first touch input corresponding to the first fiducial may have a first x,y coordinate and the second touch input corresponding to the second fiducial may have a second x,y coordinate. The x,y coordinates of the touch inputs may be compared to determine a distance between touch inputs. It should be appreciated that while distance determination is described herein as being performed using an x,y-coordinate system, other means of determining distance may be utilized.

With respect to determining the orientation of fiducials with respect to each other, directional data may be determined for a line formed by connection of two points corresponds to two touch inputs. Directional data may be determined for a line associated the first fiducial and the second fiducial. The directional data may be utilized to determine how the fiducials are oriented with respect to each other.

Additionally, or alternatively, the objects may include physical fiducials located on a side of the object opposite the side in contact with the surface. Light from the projector may hit the surface and the fiducials. The fiducials may be configured to reflect light in a manner that differs from how light is reflected by the surface and/or other portions of the object. The light reflected by the fiducials may be captured by one or more cameras, which may generate corresponding image data. The image data may be analyzed and the portions of the image data corresponding to the light reflected off the fiducials may be identified. Using this information, the number of fiducials may be identified, distances between the fiducials may be determined, and directional data associated with the fiducials may be determined. This information may be utilized to determine and/or confirm that the contacts on the touchscreen are caused by fiducials of an object.

Additionally, or alternatively, the projector may project a light array onto the surface. A portion of the light array may hit the fiducials, which may cause distortion of the light array in a manner that differs from distortion, if any, caused by the surface and/or other components of the object. The cameras may capture the distorted light reflected off the fiducials and generate corresponding image data. The distorted light may be identified by analysis of the image data to identify the number of fiducials and/or their arrangement.

Additionally, or alternatively, the fiducials may include lighting elements that emit light. The lighting elements of the fiducials may be configured to output light at a given wavelength and/or modulation that differs from light reflected off the surface and/or other components of the object. The cameras may capture the light output by the light elements of the fiducials and generate corresponding image data. The image data may be analyzed and the number of fiducials and their arrangement with respect to each other may be determined.

Additionally, or alternatively, the objects may be configured to send data to the device having the surface and/or the projector that indicates an arrangement of the fiducials. For example, the objects may send data via the network interfaces described above via, for example, Bluetooth protocol. The data may be received by the device having the surface and/or the projector, a mobile device, and/or a communal device. The data may indicate the number of fiducials associated with the object and/or the orientation of the fiducials with respect to each other. Some or all of this data may be utilized to determine that touch inputs correspond to touches by fiducials of an object.

At block 1310, the process 1300 may include determining a location of the object with respect to the surface based at least in part on the arrangement of the fiducials. The determination of the location may be based at least in part on the shape of the object and/or the fiducials. One or more methods may be utilized to determine the location of the object. For example, the touch input information may be utilized to determine x,y coordinates of touches that correspond to fiducials of the object. Based at least in part on these touch inputs, and, in examples, the identity of the object, the location of the object with respect to the display may be determined.

Additionally, or alternatively, the RFID information described above may be utilized to determine the location of the object. For example, an object may have an RFID tag associated with it. A first RFID scanner associated with the display may scan the RFID tag of the object, which may indicate a first distance between the first RFID scanner and the RFID tag. A second RFID scanner associated with the display may scan the RFID tag of the object, which may indicate a second distance between the second RFID scanner and the RFID tag. In examples where the two RFID scanners are disposed in adjacent corners, the first distance and the second distance may be compared to determine the location of the RFID tag associated with the object. The location of the RFID tag, along with the identity of the object as determined by, for example, the RFID tag, may be utilized to determine the location of the object. Additionally, or alternatively, the QR code information described above may be utilized in a manner similar to the use of RFID information.

Additionally, or alternatively, time-difference-of-arrival data may be utilized to determine the location of the object. For example, where the object includes one or more sound emitters, the sound emitters may produce sound, which may be captured by two or more microphones of the device having the display and/or the projector. A time at which each of the microphones receives the sound may be determined and a time-difference-of-arrival calculation may be performed to determine the differences in time at which the sound arrived at the microphones. This information may be utilized to determine a distance from each of the microphones to the sound emitter, which may be utilized to determine a location of the sound emitter and thus a location of the object.

Additionally, or alternatively, image data captured by one or more cameras may be utilized to determine the location of the object. For example, images representing the display and the object placed thereon may be captured by the one or more cameras, which may generate corresponding image data. The image data may be analyzed to determine where portions of the image corresponding to the object are located. Additionally, or alternatively, a grid pattern may be disposed on the object and another, dynamic, grid pattern may be disposed on the surface. Inferences between the grid pattern on the object and the grid pattern on the surface may be determined and may be utilized to determine the location of the object. For example, a specific interference between the two grid patterns may correspond to the object being in a particular location known to exhibit the same or a similar interference.

At block 1312, the process 1300 may include causing the projector to present second content onto the surface. The second content may be presented based at least in part on the location of the object. The second content may be selected based at least in part on at least one of the identity of the object, the location of the object, or the shape of the object. By way of example, the content may include a game. The game may present a number of letters and/or numbers on the screen along with a visual and/or audible instruction to select a given letter or number, such as the number "5." The user may place the object on the screen and may slide or otherwise place the object such that the number "5" is framed by the border of the object. If the user successfully navigates the object to the "5," as determined from the location of the object for example, second content may be selected reflecting that the user has chosen the correct number. For example, a visual indication that the user has chosen the correct number may be selected, such as "Congratulations!" The visual indication may be displayed within the border of the object and/or on other portions of the screen. Additionally, or alternatively, audio may be output by one or more speakers associated with the screen based at least in part on the object's location. For example, the audio may provide an audible indication that the user has successfully navigated the object to the "5."

The process 1300 may additionally, or alternatively, include identifying additional fiducials of a second object that has been placed on the surface and determining a second location of the second object based at least in part on the additional fiducials. The process 1300 may also include determining that the first location is within a threshold distance from the second location. Based at least in part on determining that the first location is within a threshold distance from the second location, the process 1300 may additionally include causing the projector to present third content onto the surface.

By way of example, one or more renderings of puzzle pieces may be displayed on the surface. The objects may be utilized to "grab" a puzzle piece and move that puzzle piece around the surface and/or into proximity with other puzzle pieces. A user may move the first object to a portion of the surface on which a puzzle piece is displayed. A second object may be introduced to the surface and may "grab" another puzzle piece. The user may then move one or more of the objects into proximity with each other in a manner similar to how a user would move two physical puzzle pieces together. Based at least in part on the objects being within a threshold distance of each other, the third light may be projected. Using the puzzle game example provided herein, a user may move a first object toward a second object such that the first object is touching or is nearly touching the second object. Based at least in part on the proximity of the two objects being within a threshold distance from each other, a local device and/or a remote system associated with the surface may update the content displayed on the surface. Here, for example, the content displayed on the surface may be updated such that the two puzzle piece renderings may appear to be connected to each other. Additionally, or alternatively, a determination that two or more objects are within a threshold distance from each other may enable and/or disable functionality of the surface, the objects, the local device, the remote system, and/or an application being utilized in connection with the objects.

The process 1300 may additionally include determining a shape of the object based at least in part on determining a first location of the first fiducial and a second location of the second fiducial. For example, the touch input information described above may be utilized to determine the shape of the object. By way of example, the object may be configured with fiducials that are disposed on corners and/or edges of the object. The orientation of the fiducials may be determined and that information may be utilized to determine the outline and/or boundary of the object. This information may be utilized to determine the shape of the object. By way of example, an object may have a square shape with one fiducial disposed in each of the four corners of the object along with, in some examples, additional fiducials disposed on the border of the object. Once placed on the surface, the orientation of the fiducials may be determined. Here, the orientation of the fiducials is at equal distances from each other and each arrangement of any three of the four fiducials is at a 90-degree angle. Based at least in part on the arrangement information, it may be determined that the shape of the object is a square.

Additionally, or alternatively, in examples where the object includes an RFID tag, RFID scanners of the device having the surface and/or the projector may scan the RFID tag, which may provide an identifier of the object. The identifying information may additionally include an indication of the shape of the object. This information may be utilized to identify the shape of the object. Additionally, or alternatively, in examples where the object includes a QR code, QR code scanners of the device having the display and/or the projector may scan the QR code, which may provide an identifier of the object. The identifying information may additionally include an indication of the shape of the object. This information may be utilized to identify the shape of the object.

Additionally, or alternatively, image data may be utilized that is captured by one or more cameras to determine the shape of the object. For example, images representing the display and the object placed thereon may be captured by the one or more cameras, which may generate corresponding image data. The image data may be analyzed to determine the boundary of the object, which may be utilized to determine the shape of the object.

The process 1300 may also include receiving first data via at least one force sensor associated with the surface. The data may indicate contact by the fiducials with the surface at a first force. The process 1300 may also include receiving second data via the force sensor indicating contact by the fiducials with the touchscreen at a second force. Based at least in part on the second data, the process 1300 may include determining that at least a portion of the object has been pressed. For example, the object may include a button or other actuatable portion and/or the content displayed with respect to the object may include a rendering of a button or other selectable portion. A user may press the button or button rendering on the object and the press of the object may cause the resistors to detect the second force. The process 1300 may additionally include causing a device associated with the surface to perform an action based at least in part on determining that the at least the portion of the object has been pressed.

The process 1300 may also include sending, to another system, image data corresponding to the first content for display of the first content on another surface of the other system. The process 1300 may also include receiving, from the other system, data indicating that a second object associated with the other system is located at a second location with respect to the other surface and causing the projector to project third light onto the surface. The third light corresponding to a rendering of the second object at a third location of the surface, the third location correlated to the second location.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method, comprising:
causing first content to be displayed on a display of a touchscreen;
determining that touch input has been received via the touchscreen;
determining a first contact with the touchscreen based at least in part on first data corresponding to the touch input;
determining a second contact with the touchscreen based at least in part on the first data;
determining an arrangement of the first contact and the second contact;
determining that the first contact corresponds to a first fiducial of a first object based at least in part on the arrangement of the first contact and the second contact;
determining that the second contact corresponds to a second fiducial of the first object;
determining a first location of the first object with respect to the display based at least in part on the first fiducial and the second fiducial;
causing second content to be displayed at the first location; and
causing a representation of movement of a second object to be displayed on a first portion of the display, the first portion of the display determined from second data received at the touchscreen indicating that the second object is moving on a second portion of a remote device, the second portion of the remote device associated with the first portion of the touchscreen.

2. The method of claim 1, wherein the touchscreen comprises resistive force sensors, determining that the touch input has been received is based at least in part on third data received from at least one of the force sensors indicating contact with at least one of the first fiducial or the second fiducial with the touchscreen at a first force, and further comprising:
receiving fourth data via at least one of the force sensors, the fourth data indicating the contact with the at least one of the first fiducial or the second fiducial with the touchscreen at a second force;
determining, based at least in part on the third data, that at least a portion of the first object has been pressed; and
causing a device associated with the touchscreen to perform an action based at least in part on determining that the at least the portion of the first object has been pressed.

3. The method of claim 1, wherein determining the first location of the object comprises:
receiving third data from a first radio-frequency identification (RFID) scanner associated with the touchscreen, the third data indicating that an RFID tag of the first object has been scanned by the first RFID scanner;
determining a first distance between the first RFID scanner and the RFID tag;
receiving fourth data from a second RFID scanner associated with the touchscreen, the fourth data indicating that the RFID tag of the first object has been scanned by the second RFID scanner;
determining a second distance between the second RFID scanner and the RFID tag; and
determining the first location of the first object based at least in part on the first distance and the second distance.

4. The method of claim 1, wherein the touchscreen comprises resistive force sensors, and determining that the touch input has been received comprises determining that the touch input has been received based at least in part on third data received from at least one of the resistive force sensors indicating contact by at least one of the first fiducial or the second fiducial with the touchscreen.

5. The method of claim 1, wherein the first fiducial and the second fiducial are disposed on a first side of the first object, the arrangement comprises a first arrangement, and further comprising:
receiving second data indicating that contact by at least one of the first fiducial or the second fiducial with the touchscreen has ceased;
receiving third data indicating that:
a third fiducial is in contact with the touchscreen; and
a fourth fiducial is in contact with the touchscreen;
determining a second arrangement of the third fiducial and the fourth fiducial;
determining that the third fiducial and the fourth fiducial are associated with a second side of the first object based at least in part on the second arrangement; and
causing third content to be displayed based at least in part on determining that the third fiducial and the fourth fiducial are associated with the second side of the first object.

6. The method of claim 1, further comprising:
identifying, based at least in part on first force data received via a force sensor of the touchscreen, a first force associated with contact by the first object with the touchscreen;
receiving second force data via the force sensor, the second force data indicating a second force associated with the contact by the first object with the touchscreen;
determining that a third object has been stacked on the first object based at least in part on the second force; and
causing third content to be displayed based at least in part on determining that the third object has been stacked on the first object.

7. The method of claim 1, further comprising:
receiving, at a first microphone associated with the touchscreen, first audio from the first object;
receiving, at a second microphone associated with the touchscreen, second audio from the first object;
generating first audio data corresponding to the first audio;
generating second audio data corresponding to the second audio;
determining a time difference of arrival of the first audio and the second audio based at least in part on the first audio data and the second audio data; and
determining the first location of the first object with respect to the touchscreen based at least in part on the time difference of arrival.

8. A system, comprising:
one or more processors; and
non-transitory computer-readable media including instructions that, when executed by the one or more processors, cause the one or more processors to perform operations comprising:
  causing first content to be displayed on a display of a touchscreen;
  determining that touch input has been received via the touchscreen;
  determining a first contact with the touchscreen based at least in part on first data corresponding to the touch input;
  determining a second contact with the touchscreen based at least in part on the first data;
  determining an arrangement of the first contact and the second contact;
  determining that the first contact corresponds to a first fiducial of a first object based at least in part on the arrangement of the first contact and the second contact;
  determining that the second contact corresponds to a second fiducial of the first object;
  determining a first location of the first object in association with the display based at least in part on the first fiducial and the second fiducial;
  causing second content to be displayed at the first location; and
  causing a representation of movement of a second object to be displayed on a first portion of the display, the first portion of the display determined from second data received at the touchscreen indicating that the second object is moving on a second portion of a remote device, the second portion of the remote device associated with the first portion of the touchscreen.

9. The system of claim 8, wherein determining that the touch input has been received is based at least in part on third data received from a force sensor of the touchscreen indicating contact with at least one of the first fiducial or the second fiducial at a first force, and the operations further comprising:
  receiving fourth data via at least one of the force sensors, the fourth data indicating the contact with the at least one of the first fiducial or the second fiducial with the touchscreen at a second force;
  determining, based at least in part on the fourth data, that at least a portion of the first object has been pressed; and
  causing a device associated with the touchscreen to perform an action based at least in part on determining that the at least the portion of the first object has been pressed.

10. The system of claim 8, wherein determining the first location of the first object comprises:
  receiving third data from a first radio-frequency identification (RFID) scanner associated with the touchscreen, the third data indicating that an RFID tag of the first object has been scanned by the first RFID scanner;
  determining a first distance between the first RFID scanner and the RFID tag;
  receiving fourth data from a second RFID scanner associated with the touchscreen, the fourth data indicating that the RFID tag of the first object has been scanned by the second RFID scanner;
  determining a second distance between the second RFID scanner and the RFID tag; and
  determining the first location of the first object based at least in part on the first distance and the second distance.

11. The system of claim 8, wherein determining that the touch input has been received comprises determining that the touch input has been received based at least in part on third data received from a resistive force sensor of the touchscreen indicating contact by at least one of the first fiducial or the second fiducial with the touchscreen.

12. The system of claim 8, wherein the first fiducial and the second fiducial are disposed on a first side of the first object, the arrangement comprises a first arrangement, and the operations further comprising:
  receiving third data indicating that contact by at least one of the first fiducial or the second fiducial with the touchscreen has ceased;
  receiving fourth data indicating that:
    a third fiducial is in contact with the touchscreen; and
    a fourth fiducial is in contact with the touchscreen;
  determining a second arrangement of the third fiducial and the fourth fiducial;
  determining that the third fiducial and the fourth fiducial are associated with a second side of the first object based at least in part on the second arrangement; and
  causing third content to be displayed based at least in part on determining that the third fiducial and the fourth fiducial are associated with the second side of the first object.

13. The system of claim 8, the operations further comprising:
  identifying, based at least in part on first force data received via a force sensor of the touchscreen, a first force associated with contact by the first object with the touchscreen;
  receiving second force data via the force sensor, the second force data indicating a second force associated with the contact by the first object with the touchscreen;
  determining that a third object has been stacked on the first object based at least in part on the second force; and
  causing third content to be displayed based at least in part on determining that the third object has been stacked on the first object.

14. The system of claim 8, the operations further comprising:
  receiving, at a first microphone associated with the touchscreen, first audio from the first object;
  receiving, at a second microphone associated with the touchscreen, second audio from the first object;
  generating first audio data corresponding to the first audio;
  generating second audio data corresponding to the second audio;
  determining a time difference of arrival of the first audio and the second audio based at least in part on the first audio data and the second audio data; and
  determining the first location of the first object with respect to the touchscreen based at least in part on the time difference of arrival.

15. A system, comprising:
one or more processors; and
non-transitory computer-readable media including instructions that, when executed by the one or more processors, cause the one or more processors to perform operations comprising:
  determining that touch input has been received via a touchscreen;
  determining a first contact with the touchscreen based at least in part on first data corresponding to the touch input;

determining a second contact with the touchscreen based at least in part on the first data;
determining an arrangement of the first contact and the second contact;
determining, based at least in part on the arrangement, that:
  the first contact corresponds to a first fiducial of a first object; and
  the second contact corresponds to a second fiducial of the first object;
determining a first location of the object in association with the touchscreen based at least in part on the first fiducial and the second fiducial;
causing content to be displayed at the first location; and
causing a representation of movement of a second object to be displayed on a first portion of the touchscreen, the first portion of the touchscreen determined from second data received at the touchscreen indicating that the second object is moving on a second portion of a remote device, the second portion of the remote device associated with the first portion of the touchscreen.

16. The system of claim 15, the operations further comprising:
receiving third data from a first radio-frequency identification (RFID) scanner associated with the touchscreen, the third data indicating that an RFID tag of the first object has been scanned by the first RFID scanner;
determining a first distance between the first RFID scanner and the RFID tag;
receiving fourth data from a second RFID scanner associated with the touchscreen, the fourth data indicating that the RFID tag of the first object has been scanned by the second RFID scanner;
determining a second distance between the second RFID scanner and the RFID tag; and
wherein determining the first location of the first object comprises determining the first location of the first object based at least in part on the first distance and the second distance.

17. The system of claim 15, wherein the content comprises first content, and the operations further comprise:
identifying, based at least in part on first force data received via a force sensor of the touchscreen, a first force associated with contact by the first object with the touchscreen;
receiving second force data via the force sensor, the second force data indicating a second force associated with the contact by the first object with the touchscreen;
determining that a third object has been stacked on the first object based at least in part on the second force; and
causing second content to be displayed based at least in part on determining that the third object has been stacked on the first object.

* * * * *